US008365298B2

(12) United States Patent
Kerschbaum et al.

(10) Patent No.: US 8,365,298 B2
(45) Date of Patent: Jan. 29, 2013

(54) COMPREHENSIVE SECURITY ARCHITECTURE FOR DYNAMIC, WEB SERVICE BASED VIRTUAL ORGANIZATIONS

(75) Inventors: Florian Kerschbaum, Karlsruhe (DE); Philip Robinson, Karlsruhe (DE); Jochen Haller, Karlsruhe (DE); Rafael José Deitos, Santa Catarina (BR)

(73) Assignee: SAP AG, Walldorf (DE)

( * ) Notice: Subject to any disclaimer, the term of this patent is extended or adjusted under 35 U.S.C. 154(b) by 1059 days.

(21) Appl. No.: 11/529,954

(22) Filed: Sep. 29, 2006

(65) Prior Publication Data
US 2008/0104708 A1 May 1, 2008

(51) Int. Cl.
*H04L 29/06* (2006.01)
(52) U.S. Cl. .................... 726/27; 726/1; 726/4; 726/10; 713/165; 713/166; 713/167; 709/229
(58) Field of Classification Search .................. 709/229; 705/9; 713/165–167; 726/1, 4, 10, 27
See application file for complete search history.

(56) References Cited

U.S. PATENT DOCUMENTS

| 2004/0162772 | A1* | 8/2004 | Lewis | 705/34 |
| 2005/0166260 | A1* | 7/2005 | Betts et al. | 726/4 |
| 2006/0031441 | A1  | 2/2006 | Davis et al. | |
| 2006/0041666 | A1* | 2/2006 | Karremans | 709/229 |
| 2006/0143686 | A1* | 6/2006 | Maes | 726/1 |

FOREIGN PATENT DOCUMENTS
WO   WO 2006/084331 A   8/2006

OTHER PUBLICATIONS

Denemark et al., "User Management for Virtual Organizations", Nov. 30, 2005, pp. 1-10, http://www.coregrid.net/mambo/images/stories/TechnicalReports/tr-0012.pdf.*
Hommel et al., "Supporting Virtual Organization Lifecycle Management by Dynamic Federated User Provisioning", May 26, 2006, pp. 1-12, http://www.nm.ifi.lmu.de/Publikationen/hosc06/PDF-Version/hosc06.pdf.*
Demchencko et al., "Security Architecture for Open Collaborative Environment", Jul. 11, 2005, pp. 589-599, EGC 2005, LNCS 3470/2005, Springer-Verlag Berlin Heidelberg.*

(Continued)

*Primary Examiner* — Jeffrey Pwu
*Assistant Examiner* — Hee Song
(74) *Attorney, Agent, or Firm* — Blakely, Sokoloff, Taylor & Zafman

(57) ABSTRACT

A comprehensive security architecture for a virtual organization (VO) is disclosed. The comprehensive security architecture uses the same security mechanism or substantially similar security mechanisms to control access to VO infrastructure services as it uses to control access to resource services. Infrastructure services are services used to change the state of the VO and to change membership in the VO. Resource services (e.g. processing a purchase order) are services used in furtherance of achieving the objectives of the VO (e.g. build an aircraft). A security mechanism prevents a service call from accessing the service called until the security mechanism has decided to authorize or deny the service call. A security mechanism may decide to authorize or deny the service call based on details of the service call, a set of role-based access policies, and attributes from the caller's credentials including the caller's role in the VO.

17 Claims, 19 Drawing Sheets

OTHER PUBLICATIONS

Denemark et al., "User Management for Virtual Organizations", http://www.coregrid.net/mambo/images/TechnicalReports/tr-0012.pdf. 2005, 11 pages.*

Ananta Manandhar et al., "GRID Authorization Fremework for CCLRC Data Portal," pp. 1-6, 2003, http://www.nesc.ac.uk/events/ahhm2003/AMCD/pdf/118.pdf.*

Rafae Bhatti et al., "A Trust-Based Context-Aware Access Control Model for Web-Services", Distributed and Parallel Databases, Kluwer Academic Publishers, BO, vol. 18, No. 1, Jul. 1, 2005, pp. 83-105, XP019205701.

Dongkyoo Shin Sejong University Korea: "Access Control Methods for UDDI in Web Services using XACML", ITU-T Draft Study Period 2005-2008, International Telecommunication Union, Geneva, CH, vol. Study Group 17, Oct. 5, 2005, pp. 1-8, XP017408227.

European Patent Office, Extended Search Report, Application No. 07010386.6-1238, mailed Feb. 20, 2008, Whole Document.

\* cited by examiner

COMPREHENSIVE SECURITY ARCHITECTURE FOR DYNAMIC, WEB SERVICE BASED VIRTUAL ORGANIZATIONS

FIELD OF THE INVENTION

An embodiment relates generally to the field of online collaboration and virtual organizations. More particularly, an embodiment relates to system and a method for providing security to virtual organizations.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve common objectives. Organizations are sharing services and resources across enterprise boundaries in order to undertake collaborative projects and offer services that could not be provided by individual organizations.

A growing array of technologies has emerged to help bridge the gaps between people, time and geography in such collaborative environments. One such group of technologies is known collectively as "Web Services." Web Services are governed by a set of protocols and standards for conducting commerce over the World Wide Web. The goal for Web Services is to provide a means for software systems to automatically find each other and interact over the World Wide Web. Technically, the "service" in the Web Services universe is a channel between two computers for the generation, manipulation and exchange of messages. Commercially, a service is the basic resource offered for exchange in on line transactions.

Web Service protocols are based on the extensible Markup Language (XML). An XML schema is a set of rules for storing data hierarchically in data objects called documents. The XML standards describe how a computer system running an XML execution engine should act when processing an XML document. Programmers can introduce data structures previously undefined by XML using compounds of existing data structures. These compound data structures can still be processed by a standard XML execution engine.

One particular application for Web Services is facilitating Virtual Organizations (VOs). VOs are a concept for forming collaborations between organizations, usually businesses. A consortium of more permanent organizations may wish to temporarily join together and share resources to produce a product or provide a service together that they could not do as fast or as well separately. A traditional way to form a collaboration is for the participants to create a jointly owned legal entity. However, this may be unattractive since such entities can require substantial amount of resources, including resources to establish and maintain accounting for the joint entity and management staff to run the joint entity. VOs offer an attractive alternative since they are not legal entities, organized instead with contracts describing the objectives of the collaboration and describing the roles and duties of the participants.

Web Services can facilitate VOs by automating the process of integration, reducing the cost of integration as well as the time required. A choreography may be written that describes all the objectives to which the participants are committed, the roles assigned to participants and the interactions between roles. From the choreography, services and processes can be developed to carry out objectives assigned to each role. Each participant organization in the VO provides the services and carries out the processes for the roles it is assigned. In carrying out assigned processes, a role may have to call on services made available as VO resources by other roles. A participating organization providing services as resources for a VO over the World Wide Web will need to address concerns about security. The service providing organization will want a mechanism to control access to the services that it offers as resources to a VO to only parties that have authorization to call on these services and will want a mechanism to authenticate the identity of parties calling on these services.

Operating a VO requires a VO management system that facilitates the administration and management of the infrastructure of a VO. Such a VO management system enables the creation, deletion and performs other infrastructure operations on the state of the VO. A VO management system may assign roles to individual organizations in the VO to carry out the choreography of the VO. Such role assignments will require the VO management system to add, remove and replace the members of the VO. A management system for a VO that operates over the World Wide Web will also need to address concerns about security. A VO management system will need a mechanism to control access to the services that it offers, allowing only authorized parties to call the services to create and change the state of a VO and to change the membership of the VO. A VO management system will also need a mechanism to authenticate the identity of parties calling on these services.

Securing VOs (or similar forms of collaborations) has been considered before. Some security systems secure the authentication and access control for the services offered as resources to a VO to further the objectives of the VO (referred to as "resource services"), but do not secure the authentication and access control for VO management services (referred to as "infrastructure services"). Some security systems provide access control based on VO membership, but not based on the roles assigned VO members. Some security systems provide unified management over a distributed VO, but sacrifice local control of security. Other security systems provide local control of security, but do not have a unified management system. What is needed is a security architecture to provide authentication and role-based access control for both the resource services and infrastructure services of a VO with distributed membership using a unified management system, but without sacrificing local control of security.

SUMMARY OF THE INVENTION

A comprehensive security architecture for controlling access to the services of a virtual organization (VO) is described. Methods for the operation of a comprehensive security architecture are described.

One embodiment of the invention comprises a security architecture of a single security mechanism that controls access to all the services of a VO, both resource services and infrastructure services.

One embodiment of the invention includes a security architecture of multiple security mechanisms, all identical or substantially similar, one for each organization that is a member of the VO or providing services to the VO. Each security mechanism has the ability to control access to different types of VO services, including resource services and infrastructure services.

One embodiment of the invention includes a security architecture of multiple security mechanisms, all identical or substantially similar, one for each organization that is a member of the VO or providing services to the VO. Each security mechanism has the ability to control access to different types of VO services, including resource services and infrastructure services. Each security mechanism comprises a policy enforcement point (PEP) and a policy decision point (PDP) wherein the PEP has the capability to authenticate service calls and prevent the service calls from accessing a VO service until the PDP has made a decision whether to authorize or deny the service call access.

One embodiment of the invention comprises a method by which a security architecture controls access to VO services using identical or similar security mechanisms. The same method is used to control access to resource services and to control access to infrastructure services.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A system and method for a comprehensive security architecture for dynamic, web based virtual organizations (VOs) is described. In the following description, for purposes of explanation, numerous specific details are set forth in order to provide a thorough understanding of an embodiment of the present invention. It will be evident, however, to one skilled in the art that the present invention may be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
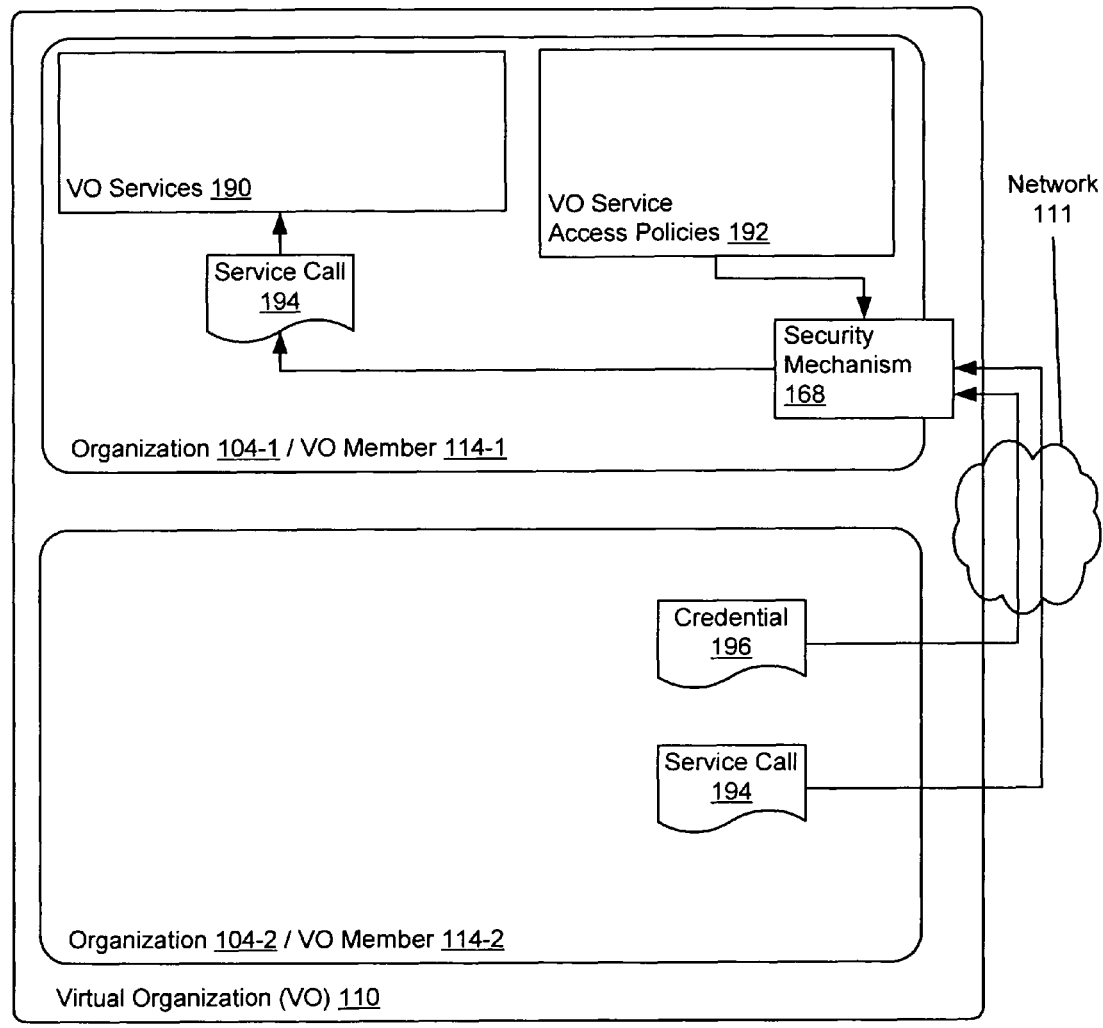
FIG. 1 shows an embodiment of a comprehensive VO (virtual organization) security architecture with a single security mechanism.

FIG. 1 shows an embodiment of a VO security architecture with a single security mechanism. A virtual organization (VO) 110 is shown with a first organization 104-1 and a second organization 104-2 participating in the VO 110 as a first VO member 114-1 and a second VO member 114-2 respectively. The VO members 114-1 and 114-2 are connected by a network 111, such as the World Wide Web, through which they can send messages (e.g. service call 194) to each other. The first VO member provides a set of VO services 190. In one embodiment, the VO services 190 comply with one or more web service protocols.

A security mechanism 168 is provided by the first VO member 114-1 to control access to the set of VO services 190. The security mechanism 168 controls access to VO services 190 by preventing a service call 194 from accessing the VO services 190 until the security mechanism 168 makes a decision to authorize or deny the service call 194.

Figure 2:
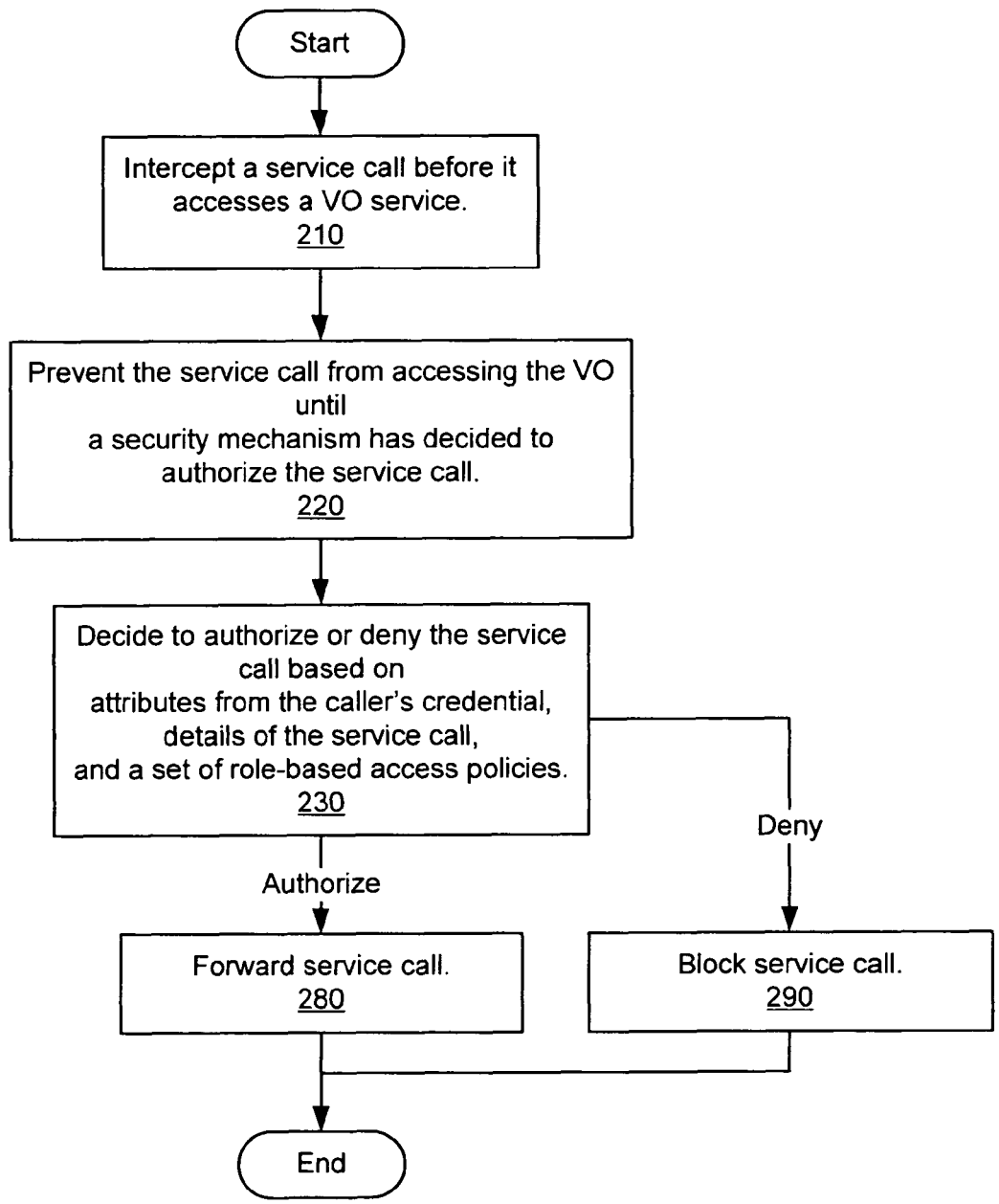
FIG. 2 shows a flow diagram of a method that a security mechanism performs in response to a service call.

FIG. 2 shows a flow diagram of a method that a security mechanism 168 performs in response to a service call 194. A service call 194 has been sent to one of the VO services 190 by a caller (here, the second VO member 114-2) requesting the one of the VO services 190 called to perform a certain operation. Along with the service call 194, the caller has sent a credential 196 as evidence of its authority to make the service call 194. In one embodiment, the first VO member 114-1 already is in possession of a copy of the credential 196 and the second VO member does not send a copy with the service call 194.

In stage 210, the security mechanism 168 intercepts the service call 194 before the service call 194 accesses the VO services 190. In stage 220 the security mechanism 168 prevents the service call 194 from accessing the VO service 190 until the security mechanism 168 decides to authorize or deny the service call 194. In stage 230, the security mechanism 168 decides to authorize or deny the service call 194 based on attributes from the caller's credential 196, details of the service call 194, and a set of role-based VO service access policies 192.

In one embodiment of stage 230, the security mechanism 168 first verifies the caller's identity using one of several known authentication techniques. The security mechanism 168 then verifies the credential 196 is authentic. Next, the security mechanism 168 verifies the caller's identity matches the identity of the organization assigned to the role as specified in the credential 196. The security mechanism 168 then verifies that VO identified in the credential 196 matches the VO identified in the method of the service call 194. This ensures that the caller's credential is associated with the VO 110 the service call 194 is attempting to access, not with an unrelated VO. The security mechanism 168 then checks with the VO service access policies 192 to verify that the particular role specified in the credential 196 is allowed to make the particular service call 194 to the particular one of the VO services 190 called. In particular, the security mechanism 168 verifies that the role specified in the credential 196 is allowed request the particular operation the service call 194 requested to be performed by the particular VO service 190.

If all the verifications in stage 230 are completed satisfactorily, then the security mechanism 168 performs stage 280, forwarding the service call 194 to the particular one of the VO services 190 requested. If one of the verifications of stage 230 fails, then the security mechanism performs stage 290 of blocking the service call from access to the one of the VO services 190 that it requested.

Figure 3A:
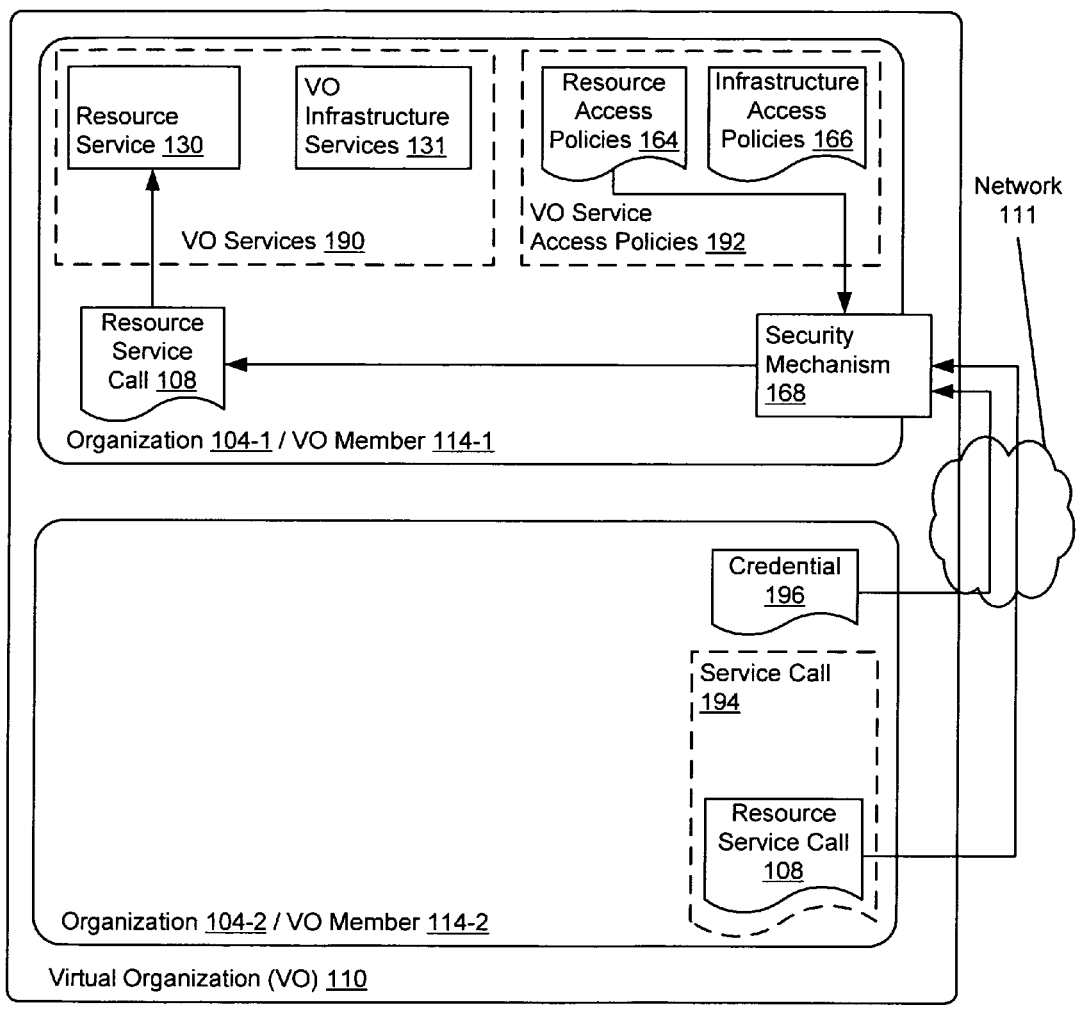
FIGS. 3A and 3B offer a more detailed view of the comprehensive VO security architecture embodied in FIG. 1.
Figure 3B:
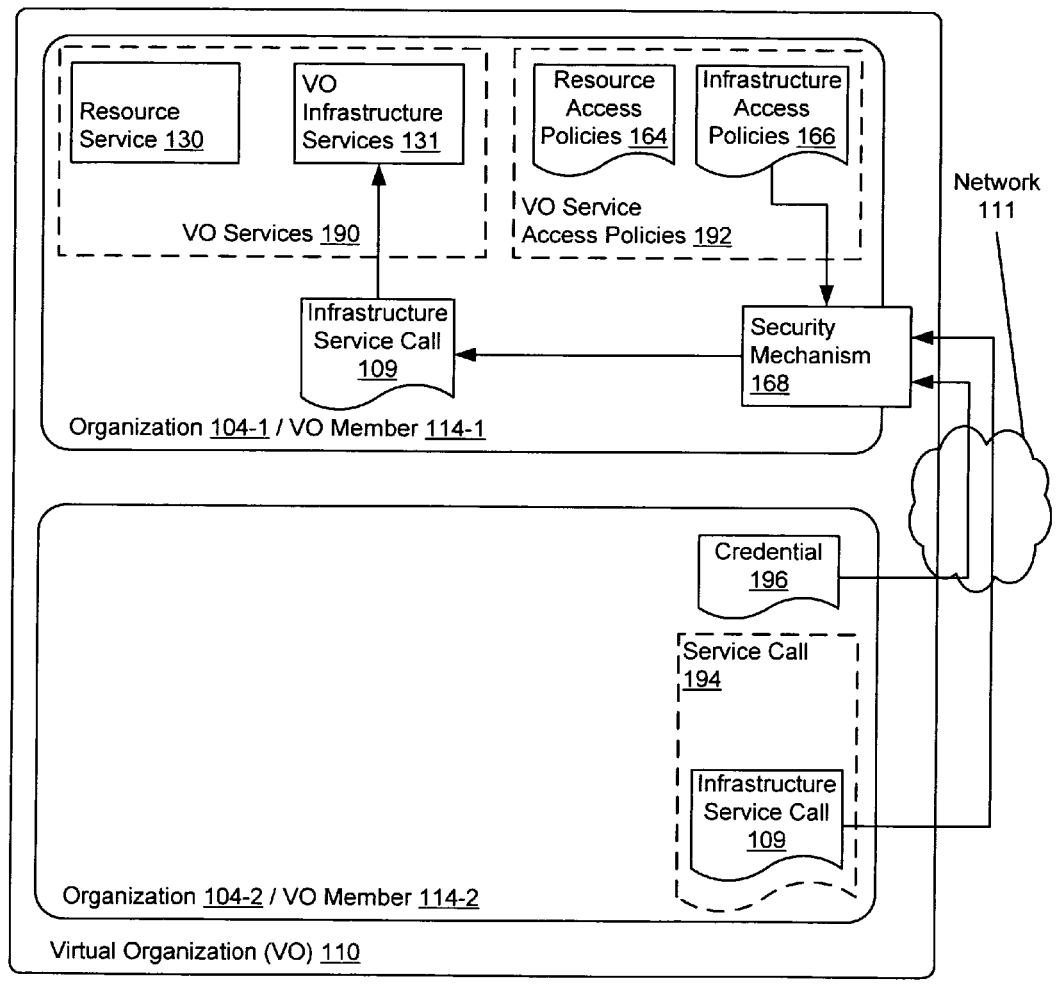

FIGS. 3A and 3B offer a more detailed view of the security architecture embodied in FIG. 1. These illustrations show the set of VO services 190 include both a resource service 130 and a set of VO infrastructure services 131. The resource service 130 is a service that the first VO member 114-1 provides to the VO 110 for other VO members 114 to call on to perform operations necessary to advance the objectives of the VO 110. The VO infrastructure services 131 are services that perform operations necessary for creating or changing the state of the VO 110, for changing membership in the VO 110 or for providing information about the VO 110. In one embodiment, the first VO member 114-1 provides the VO infrastructure services 131, but in other embodiments, the VO infrastructure services 131 may be provided by another VO member or a third party that is not a VO member. In one embodiment all the VO infrastructure services 131 are provided by one organization. In other embodiments, the VO infrastructure services 131 are provided by more than one organization. In one embodiment, only the first VO member 114-1 provides a resource service 130, but in other embodiments, other VO members 114 may provide other resource services.

The service call 194, viewed in more detail, may be either a resource service call 108 or an infrastructure service call 109. The set of VO service access policies 192 includes resource access policies 164 and infrastructure access policies 166. If the service call 194 is a resource service call 108, as shown in FIG. 3A, then the security mechanism 168 checks with the resource access policies 164 to verify that the particular role specified in the credential 196 is allowed to make the particular resource service call 108 to the particular resource service 130. Principally, the security mechanism 168 verifies the role specified in the credential 196 is allowed to request the particular resource service 130 to perform the particular operation requested. If the service call 194 is a infrastructure service call 109, as shown in FIG. 3B, then the security mechanism 168 checks with the infrastructure access policies 166 to verify that the particular role specified in the credential 196 is allowed to make the particular infrastructure service call 109 to the particular one of the infrastructure services 131. Principally, the security mechanism 168 verifies the role specified in the credential 196 is allowed to request the particular one of the infrastructure services 131 to perform the particular operation requested.

Figure 4:
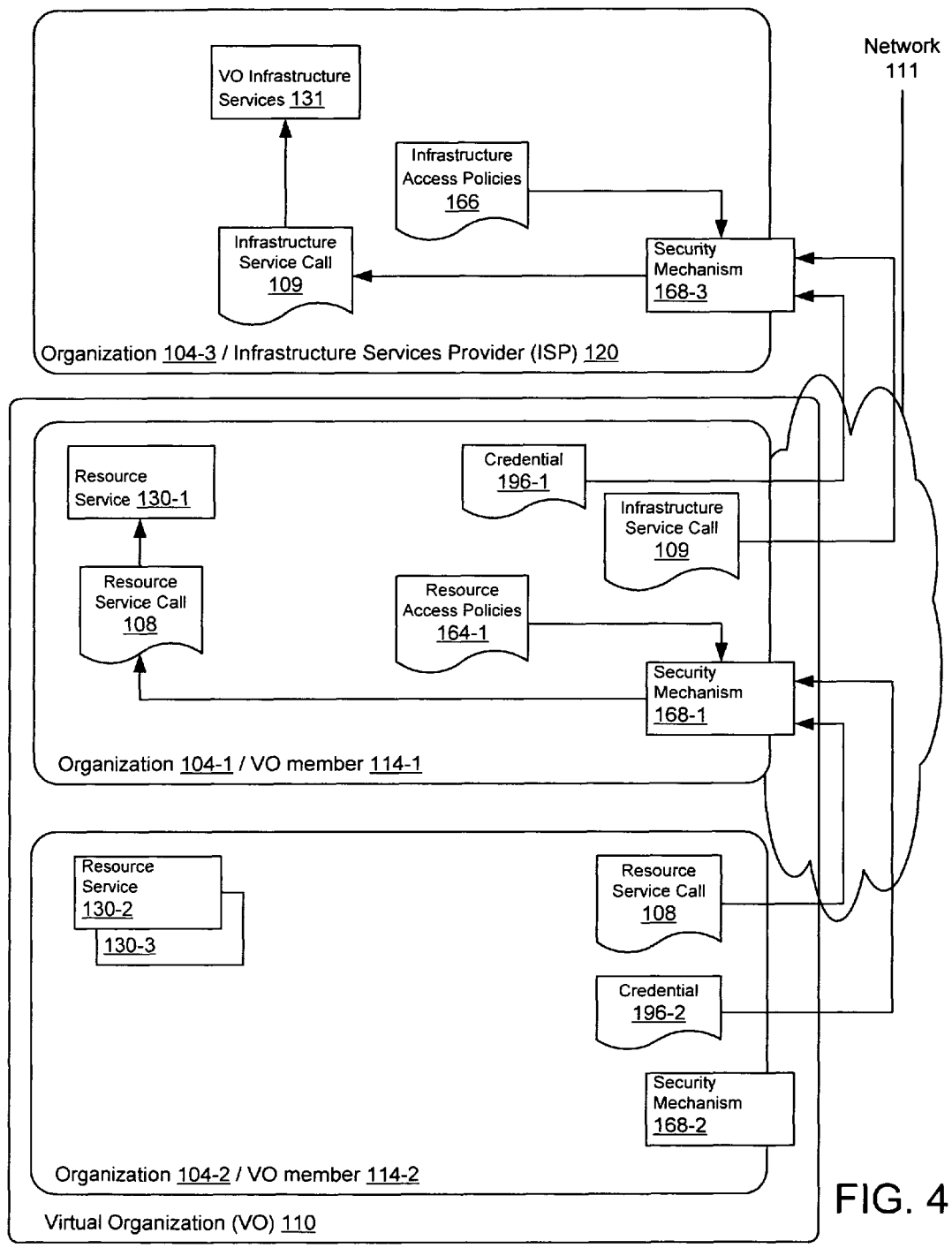
FIG. 4 shows an embodiment of a VO security architecture with multiple security mechanisms and illustrates methods used by the multiple security mechanisms to control access to VO services.

FIG. 4 illustrates an embodiment of a VO security architecture with multiple security mechanisms. In this embodiment the VO infrastructure services 131 are provided by a third organization 104-3, not a member of the VO 110, that acts as an infrastructure service provider (ISP) 120. The first VO member 114-1 offers a resource service 130-1 and the second VO member offers two resource services 130-2 and 130-3. Each of the three organizations has a security mechanism 168 that is identical or substantially similar to the other two security mechanisms 168. Each security mechanism 168 serves to control access to the resource services 130 or VO infrastructure services 166 offered by the organization 104 providing the security mechanism 168. In some embodiments, each security mechanism 168 serves to control access not only to the resource services 130 or VO infrastructure services 166 offered by the organization 104 providing that particular security mechanism 168, but may control access to the services offered by another organization 104.

Also demonstrated in FIG. 4 are aspects of an embodiment of a VO security architecture with multiple security mechanisms 168 in operation. An infrastructure service call 109 is sent by the first VO member 114-1 over a network 111 to the infrastructure services provider (ISP) 120. The infrastructure service call 109 is intercepted by the security mechanism 168-3 provided by the ISP 120. The security mechanism 168-3 handles the infrastructure service call 109 in the same manner as described in the flow diagram of FIG. 2. A resource service call 108 is sent by the second VO member 114-2 over a network 111 to the first VO member 114-1 requesting a resource service 130-1 provided by the first VO member 114-1 to perform an operation. The resource service call 108 is intercepted by the security mechanism 168-1 provided by the first VO member 114-1. The security mechanism 168-1 handles the resource service call 108 in the same manner as described in the flow diagram of FIG. 2.

Figure 5:
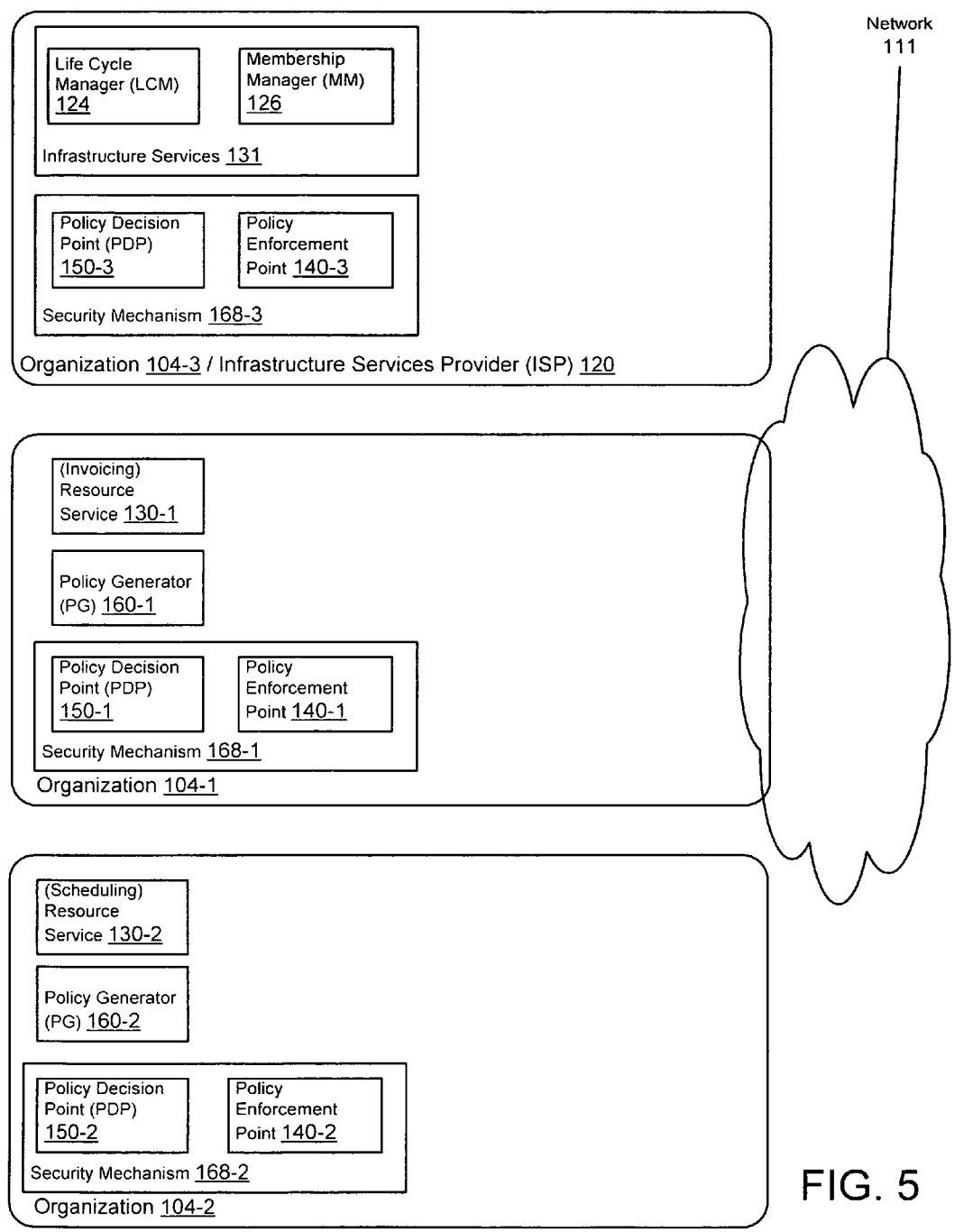
FIG. 5 shows several independent organizations and software components they provide before the organizations form a VO and a security architecture.

FIG. 5 shows several independent organizations 104 and software components they provide before the organizations 104 form a VO and a security architecture. The security mechanisms 168 each include a policy enforce point (PEP) 140 and a policy decision point (PDP) 150. Each PEP 140 has the ability to prevent a service call 194 from accessing that service until the security mechanism 168 has made a decision to authorize the service call. Each PDP 150 has the ability to make a decision to authorize or deny access to a service call. Infrastructure services 131 provided by the infrastructure services provider (ISP) 120 include a life cycle manager 124 and a membership manager 126. The life cycle manager 124 has the ability to perform the operations necessary for creating and changing the state of a VO. The membership manager 126 has the ability to perform operations for changing the membership of a VO. Each organization that is to become a member of a VO has a policy generator 160 to generate resource access policies 164 to assist the organization's 104 security mechanism 168 in controlling access to the organization's resource services 130.

Figure 6:
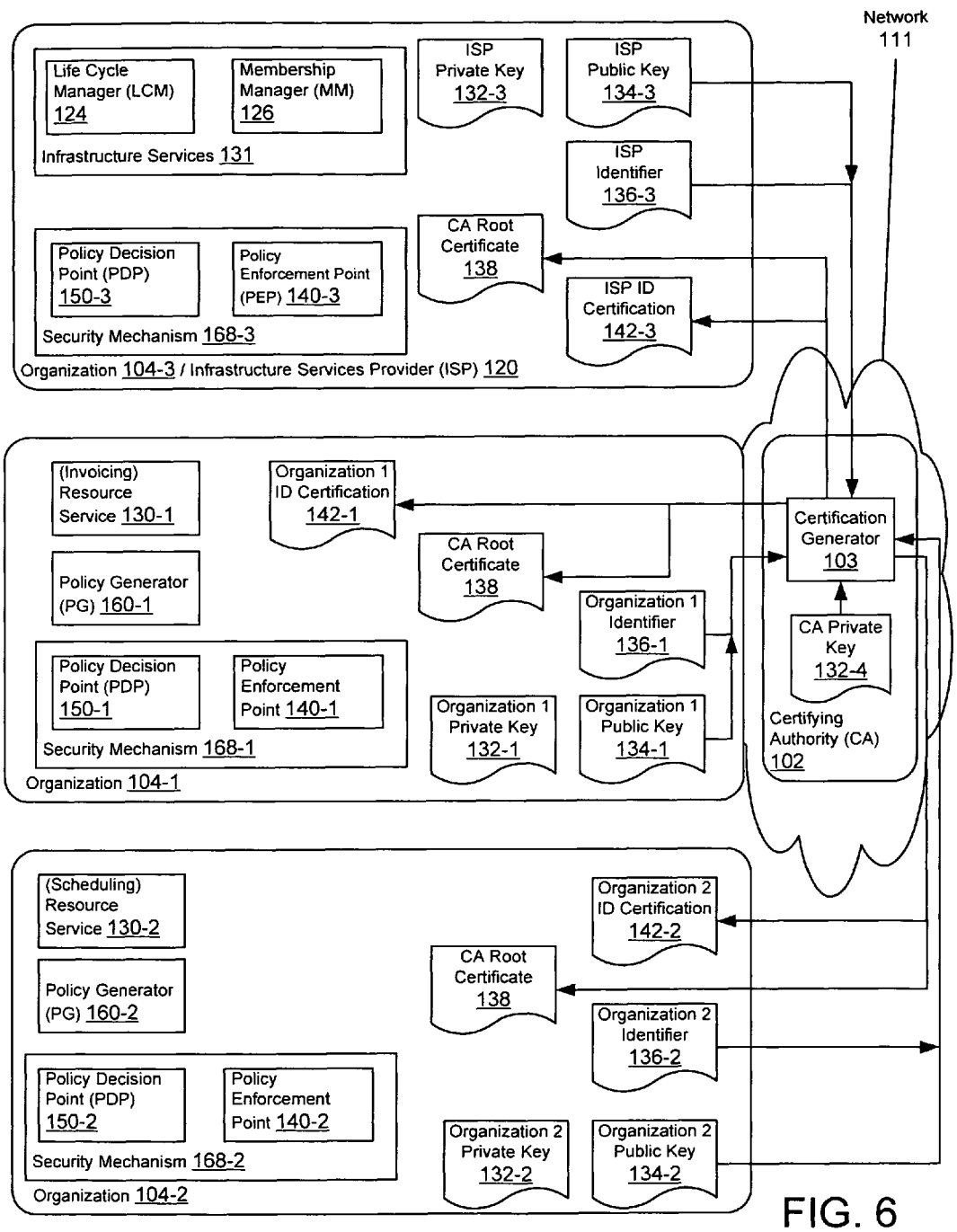
FIG. 6 illustrates a method for the organizations of FIG. 5 to obtain identity certifications.

FIG. 6 illustrates a method for the organizations of FIG. 5 to obtain identity certifications. Each organization that is to be a member in a VO or is to provide infrastructure services to such a VO first obtains an identity certification 142. Each organization sends an organization identifier 136 and the organization's public key 134 to a certifying authority (CA) 102 while keeping the associated private key 132 undisclosed. The certifying authority 102 uses a private key 132-4 associated with the certifying authority 102 to create an identity certification 142 for each organization. Each organization obtains their respective identity certification 142 and a copy of the certifying authority root certificate 138 which contains the certifying authority's public key for use in verifying the identity certificates 142 of other organizations 104.

Figure 7:
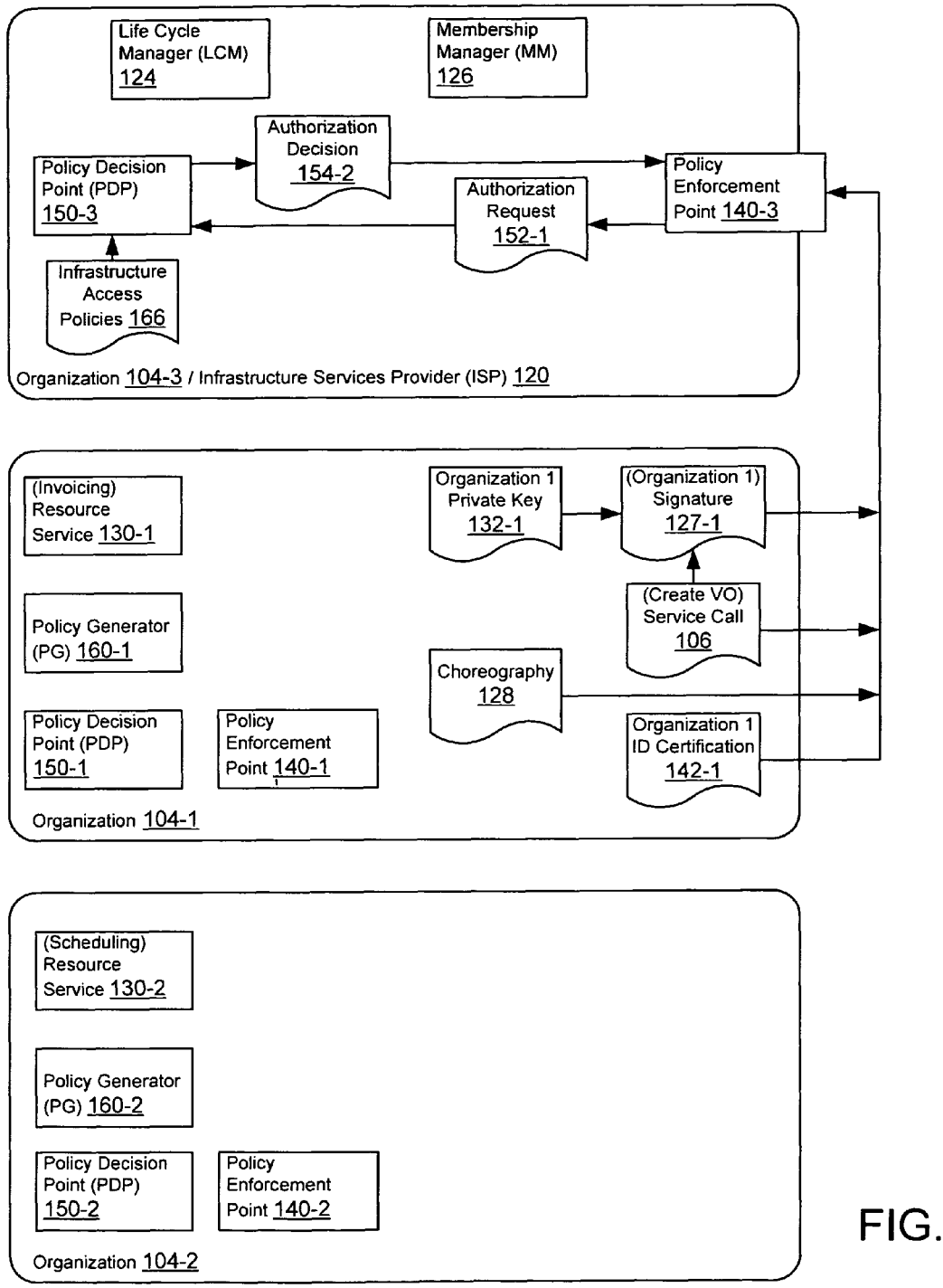
FIG. 7 illustrates a the first part of a method for creating a VO, including a method for the security mechanism of an infrastructure services provider (ISP) to handle a service call requesting to form a virtual organization (VO).

FIG. 7 illustrates a the first part of a method for creating a VO. The first organization 104-1 sends a service call 106 to create a VO to the life cycle manager 124. The first organization 104-1 creates a signature 127-1 of the (create VO) service call 106 using its private key 132-1 and sends the signature 127-1 along with the service call 106. The service call 106 may be encrypted with the private key 132-1 as well. The first organization 104-1 also includes a copy of its identity certification 142-1 and a copy of the choreography 128 that is to govern the new VO. The policy enforcement point (PEP) 140-3 of the ISP 120 intercepts and holds the service call 106. The PEP 140-3 verifies the identity of the caller using one of several well known identity authentication methods (e.g. challenge-response protocol). Since the (create VO) service call 106 is not requesting to perform operation in an existing VO, but rather request to form a new VO, no VO membership and role verifications are performed. The PEP 140-3 then extracts attributes from the first organization's identity certification 142-1, including the first organization's identifier 136-1, and some details of the service call 106. The PEP 140-3 then sends these attributes in an authorization request 152-1 to the policy decision point (PDP) 150-3. The PDP 150-3 consults associated infrastructure access policies 166 to determine if the first organization 104-1 is allowed to create a VO. The PDP 150-3 then sends an authorization decision 154-2 back to the PEP 140-3. If the authorization decision 154-2 is to deny, then the service call 106 remains blocked. If the authorization decision 154-2 is to authorize, the service call 106 is forwarded to the life cycle manager 124.

Figure 8:
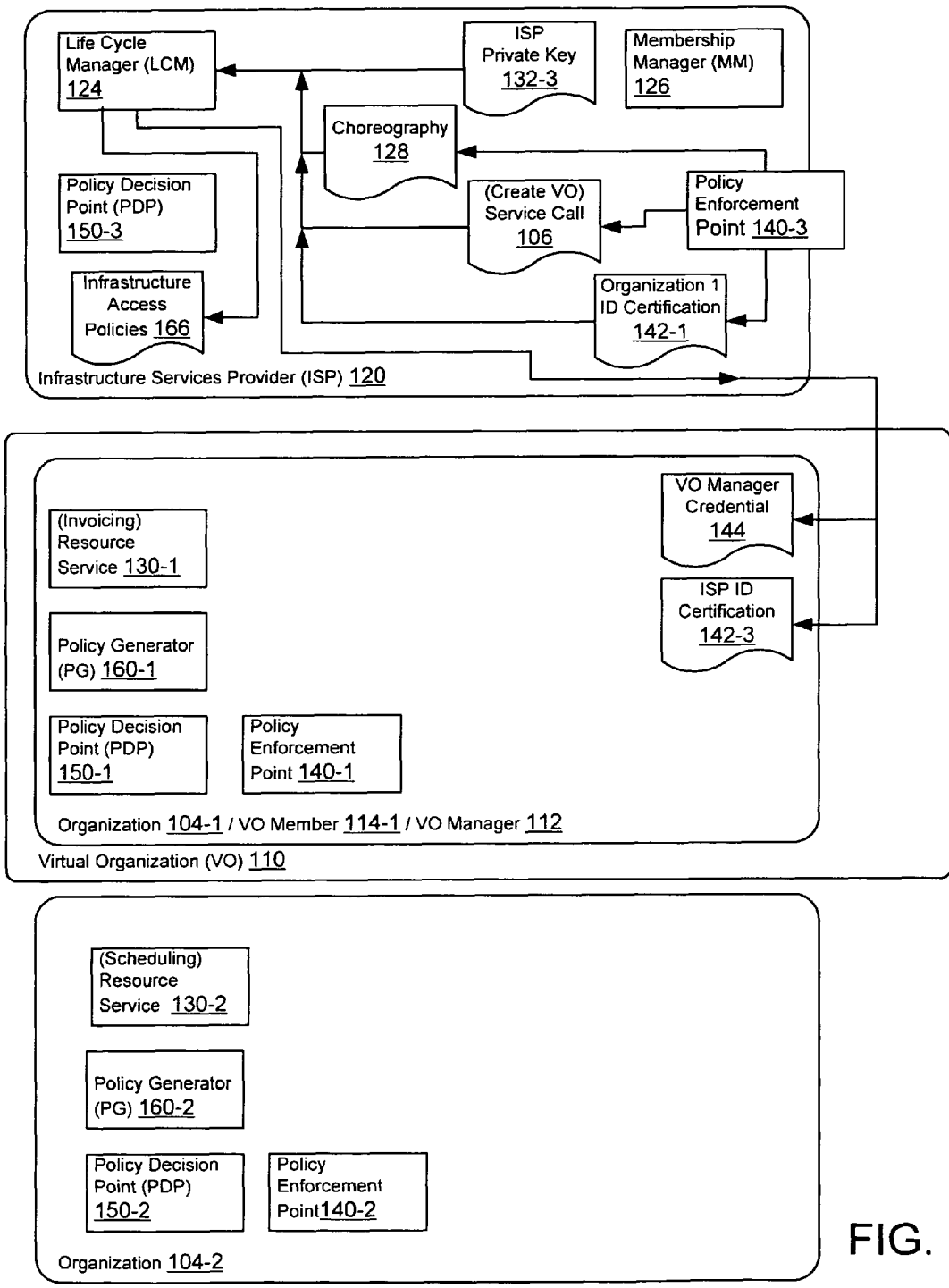
FIG. 8 illustrates a the second part of a method for creating a VO.

FIG. 8 illustrates a the second part of a method for creating a VO. After the PEP 140-3 has received an affirmative authorization decision, 154-2, the PEP 140-3 forwards the service call 106, the first organization's identity certification 142-1 and the choreography 128 to the life cycle manager 124. The life cycle manager 124 creates a virtual organization (VO) 110, and assigns the new VO 110 a VO identifier 141 (shown in FIG. 9). The life cycle manager 124 designates the first organization 104-1 as a VO member 114-1 and assigns it the role of VO manager 112. The life cycle manager 124 creates a VO manager credential 144 using the first organization's identity certification 142-1, and the ISP private key 132-2, then sends the VO manager credential 144 to the first organization 104-1 (VO manager 112). The life cycle manager 124 updates the infrastructure access policies 166 with the VO identifier 141 and entries to give the VO manager 112 authorization to make infrastructure service calls for the purpose of changing the state or membership of the new VO 110. The life cycle manager 124 associates the choreography 128 with the VO identifier 141 and stores the choreography 128.

Figure 9:
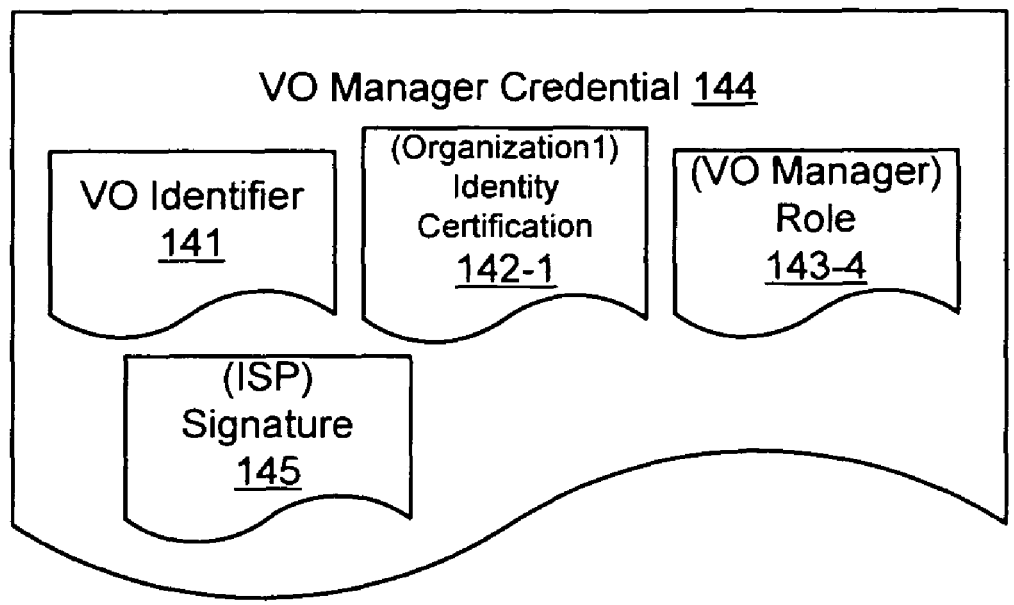
FIG. 9 shows the content of the VO manager credential.
Figure 13:
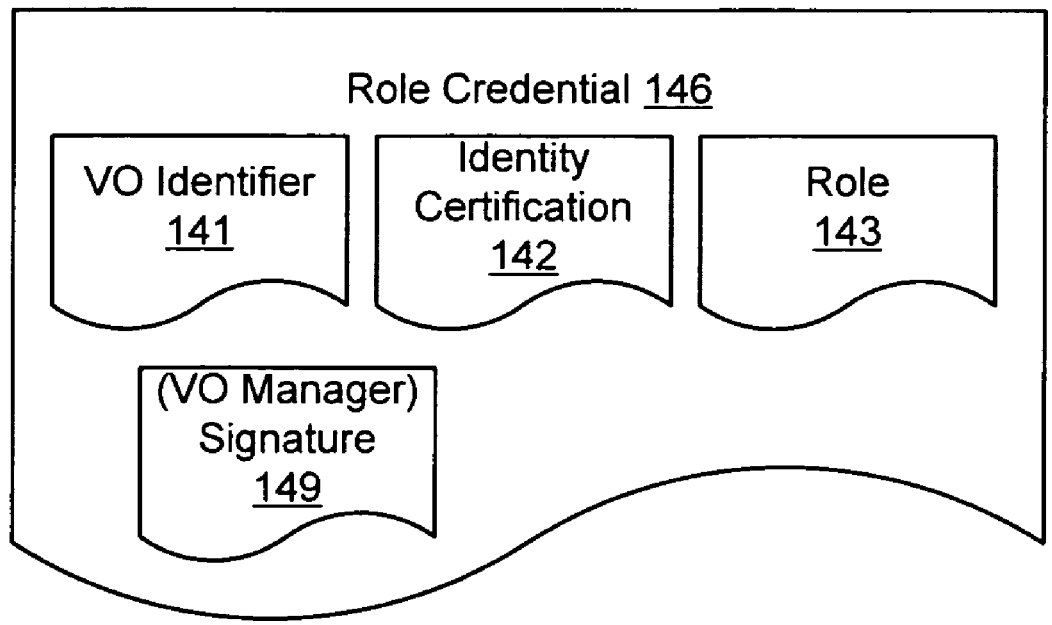
FIG. 13 shows the content of a role credential.

FIG. 9 shows the content of the VO manager credential 144. The VO manager credential 144 includes the (VO manager) role 143-4 assigned, the VO identifier 141 the life cycle manager 124 assigned to the VO 110, the organization identity certification 142-1 assigned the (VO manager) role 143-4, and a digital signature 145 made by the life cycle manager 124 using the ISP's private key 132-3. The VO manager credential 144 (FIG. 9) is similar to the role credential 146 (FIG. 13). Both are types of credentials 196, but as used in this application, the term "role credential 146" and the term "VO manager credential 144" are distinct and neither is a sub-type of the other.

Figure 10:
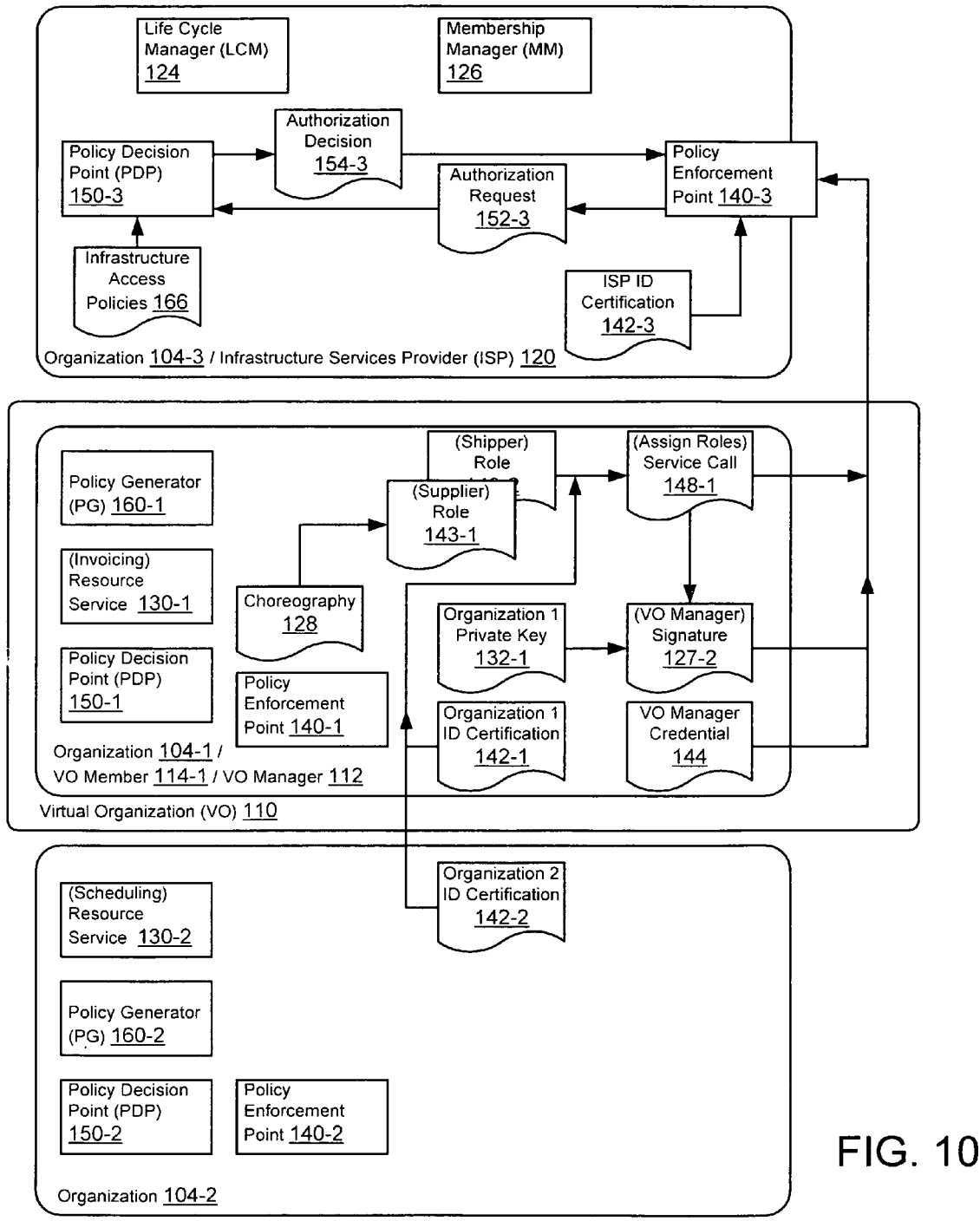
FIG. 10 illustrates the first part of a method for a VO manager to assign roles to other organizations.

FIG. 10 illustrates the first part of a method for a VO manager 112 to assign roles to other organizations 104. The VO manager 112 creates a set of roles 143 using a copy of the choreography 128. In this example, the roles created are a (supplier) role 143-1 that supplies product for the VO 110 and a (shipper) role 143-2 that ships product to customers for the VO 110. The VO manager 112 may perform this task manually or with an automated process. The VO manager 112 obtains organization identity certifications 142 from all the organizations 104 that the VO manager 112 wishes to assign roles in the VO 110. The VO manager 112 decides which organizations 104 will be assigned which roles 143. In this example the VO manager 112 assigns the second organization 104-2 the (shipper) role 143-2 and assigns its own organization 104-1 the (supplier) role 143-2. The VO manager 112 then records the assignments with an (assign roles) service call 148-1 to the membership manager 126. The VO manager 112 sends along with the (assign roles) service call 148-1, a digital signature 127-2 of the (assign roles) service call 148-1 made using the private key 132-1 of the first organization 104-1 (i.e. VO manager 112) and sends a copy of the VO manager credential 144. In one embodiment, the VO manager 112 does not send a copy of the VO manager credential 144 as the ISP 120 and every VO member 114 already possesses a copy. The policy enforcement point (PEP) 140-3 intercepts and holds the service call 148-1.

Figure 11:
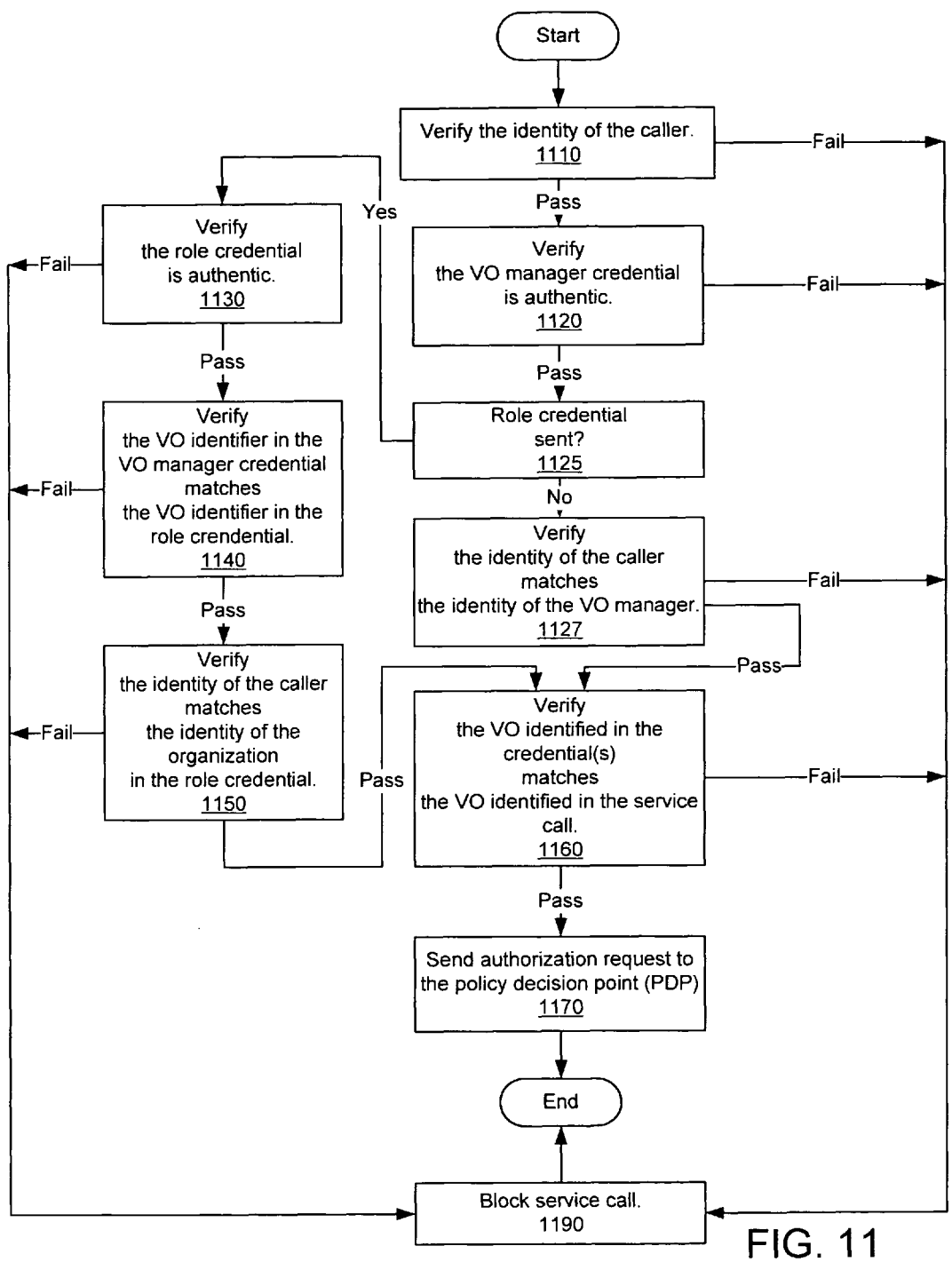
FIG. 11 shows a flow diagram of a battery of verifications a PEP (Policy Enforcement Point) performs on a service call to a VO service.

FIG. 11 shows a flow diagram of a battery of verifications a PEP 140-3 performs on a service call 148-1 to a VO service 190. If any of the verification checks in stages 1110-1160 fail, then the service call remains blocked 1190. In stage 1110, the PEP 140-3 verifies the identity of the caller using one of several well known identity authentication methods (e.g. challenge-response protocol). In stage 1120 the PEP 140-3 verifies the authenticity of the VO manager credential 144 using the ISP's public key from the ISP identity certification 142-3. In stage 1125, the PEP 140-3 checks if a role credential 146 was sent with the service call 149-1. In the case where, as here, no role credential 146 (FIG. 13) was sent, the PEP performs the actions of stage 1127. The case where a role credential 146 was sent is covered in the discussion of FIG. 16. In stage 1127, the PEP 140-3 verifies the identity of the caller matches the identity of the VO manager 112 extracted from the VO manager credential 144. In stage 1160, the PEP 140-3 verifies that the VO identifier 141 in the credentials (here, VO manager credential 144) matches the VO identifier parameter in the method of the service call 148-1. This is to verify that the caller has a credential not just for any VO, but for the particular VO 110 that the service call 148-1 is attempting to work changes on. In stage 1170, the PEP 140-3 sends an authorization request 152-3 to the policy decision point (PDP) 150-3. The PEP 140-3 sends with the authorization request 152-3 information the PDP 150-3 needs to make a decision. Such information includes relevant details of the service call 148-1, and attributes extracted from the credential(s) such as the VO identifier 141 and the role 143 (here, VO manager 143-4).

Returning to FIG. 10, the policy decision point (PDP) 150-3 evaluates authorization request 152-3 by consulting the infrastructure access policy 166 to determine if for the VO identifier 141 presented, the role presented (here, VO manager 143-4) is authorized to make the presented service call (Assign Roles 148-1). The PDP sends an authorization decision 154-3 back to the PEP 140-3 indicating whether the service call 148-1 is authorized or denied.

Figure 12:
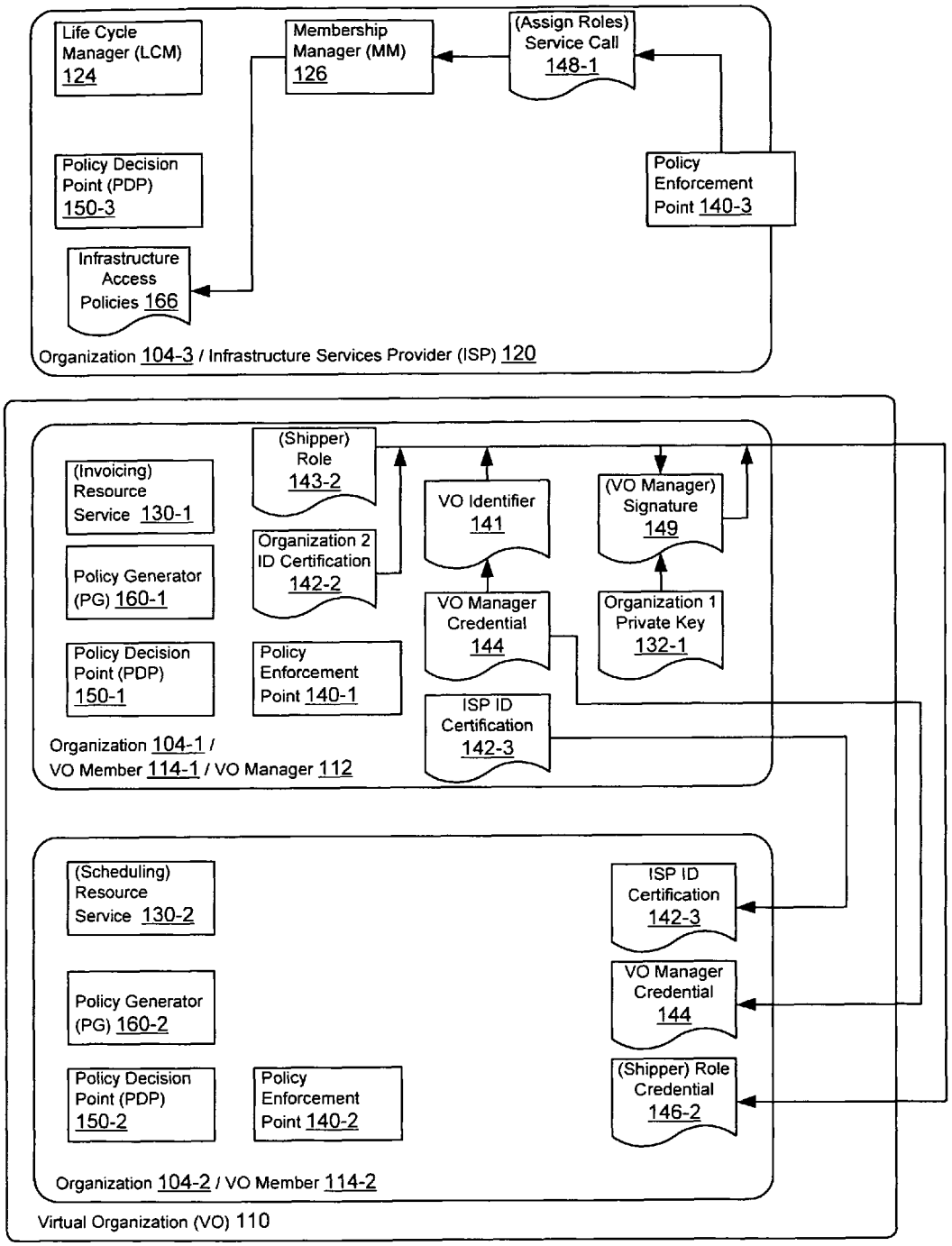
FIG. 12 illustrates the second part of a method for a VO manager to assign roles to other organizations.

FIG. 12 illustrates the second part of a method for a VO manager 112 to assign roles to other organizations 104. After receiving an affirmative authorization decision 154-3, the policy enforcement point (PEP) 140-3 forwards the (assign roles) service call 148-1 to the membership manager 126. The membership manager 126 updates the infrastructure access policies 166 according to the (assign roles) service call 148-1, with entries in the infrastructure access policies 166 for each assigned role 143, the VO identifier 141 associated with the role 143, and the infrastructure services operations each role is authorized to access. The VO manager 112 then creates and issues role credentials 146 to organizations 114 assigned roles in the VO 110. In this example, organization 104-2 has been assigned the (shipper) role 143-2 and has received the (shipper) role credential 146-2. The VO manager 112 sends a copy of the VO manager credential 144 to each recipient of a role credential 146 and a copy of the ISP identity certificate 142-3.

The VO manager 112 may wish to revoke a role credential 146 for various reasons, including in order to replace an organization 104 assigned to perform a certain role 143 with another organization 104. Revocation of role credentials 146 may be handled by known methods such as issuing revocation lists to VO members 114 and the ISP 120, or such as issuing short lived role credentials 146 that must be periodically replaced by the VO manager 112.

FIG. 13 shows the content of a role credential 146. The role credential 146 contains the VO identifier 141, the organization identity certification 142 of the organization assigned the role, the role 143 assigned and a digital signature 145 made with the private key 132-1 of the organization 104-1 performing the role of VO manager 112.

Figure 14:
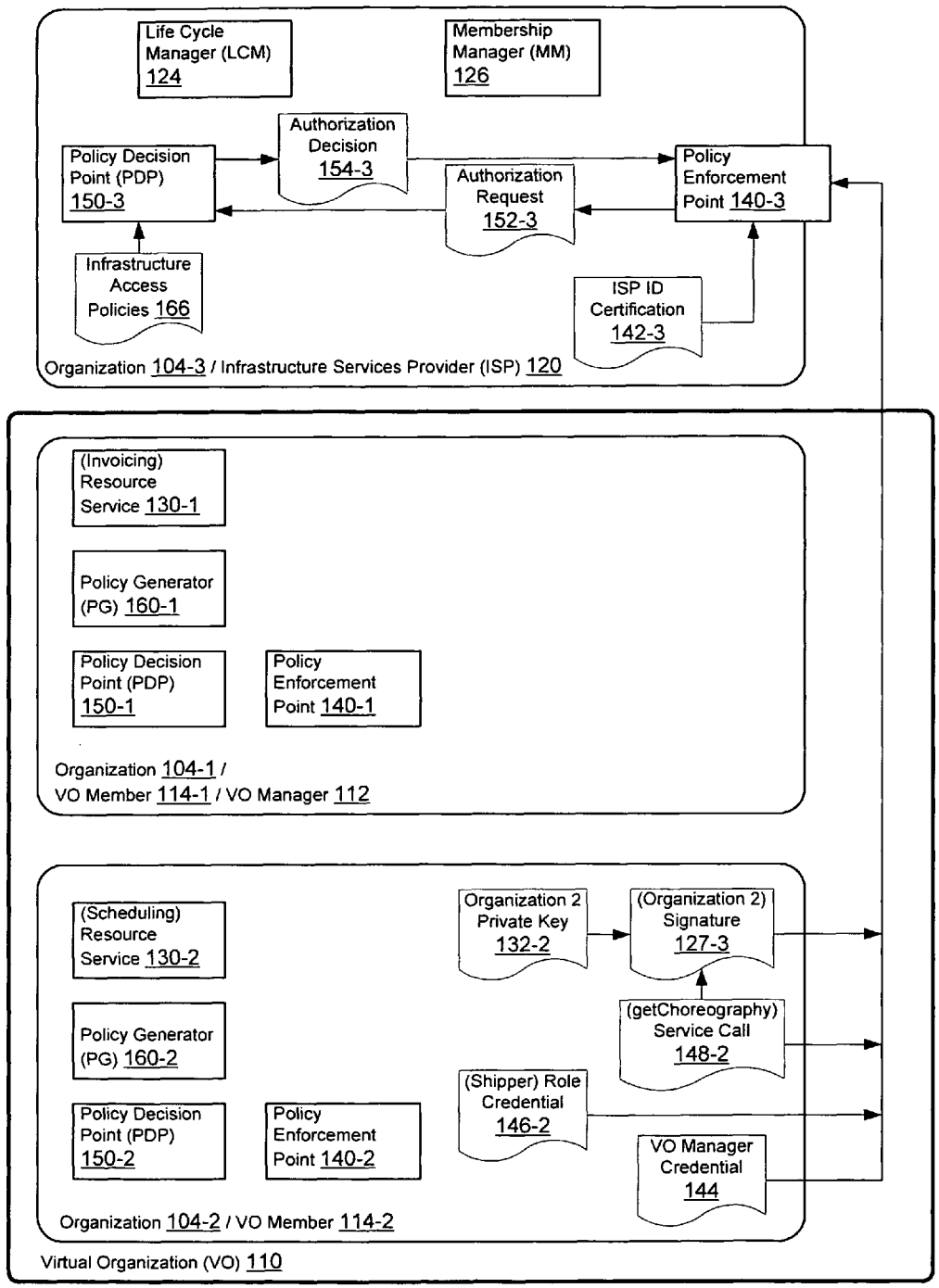
FIG. 14 illustrates the first part of method to create resource access policies, including a method for the security mechanism of an infrastructure services provider (ISP) to handle a service call requesting a copy of the choreography governing the VO.

FIG. 14 illustrates the first part of method to create resource access policies 164. In order to generate resource access policies 164, a VO member 144-2 must first obtain a copy of the choreography 128 that governs the VO 110. The VO member 114-2 sends a (get choreography) service call 148-2 to the membership management service 126 provided by the infrastructure services provider (ISP) 120. The VO member 114-2 creates a digital signature 127-3 of the service call 148-2 using the private key 132-2 of the VO member 114-2. The VO member 114-2 sends the signature 127-3 along with a copy of the VO manager credential 144 and the (shipper) role credential 146-2. In one embodiment, the VO member 114-2 does not send a copy of the VO manager credential 144 as the ISP 120 and every VO member 114 already possesses a copy. The policy enforcement point (PEP) 140-3 intercepts and holds the (get choreography) service call 148-2.

The PEP 140-3 performs a battery of verifications on the (get choreography) service call 148-2, following the process presented in the flow diagram of FIG. 11, discussed previously. If any of the verification checks in stages 110-1160 fail, then the (get choreography) service call 148-2 remains blocked 1190. In stage 1110, the PEP 140-3 verifies the identity of the caller using one of several well known identity authentication methods (e.g. challenge-response protocol). In stage 1120 the PEP 140-3 verifies the authenticity of the VO manager credential 144 using the ISP's public key in the ISP identity certification 142-3. In stage 1125, the PEP 140-3 checks if a role credential 146 was sent with the service call 148-2. In the case where, as here, a role credential 146 was sent, the PEP performs the actions of stage 1130. The case where no role credential 146 was sent, is covered in the discussion of FIG. 10 and the initial discussion of FIG. 11. In stage 1130, the PEP 140-3 verifies the (shipper) role credential 146-2 is authentic by using the VO manager public key in the organization identity certification 142 in the VO manager credential 144 to verify the (shipper) role credential 146-2 has been signed by the VO manager 112. In stage 1140, the PEP 140-3 verifies the VO identifier 141 in the VO manager credential 144 matches the VO identifier in the role credential 146-2. In stage 1150, the PEP 140-3 verifies that the identity of the caller matches the identity of the organization 104 assigned to the (shipper) role 143-2 as indicated in the organization identity certification 142-2 in the role credential 146-2. In stage 1160, the PEP 140-3 then verifies that the VO identifier 141 in the VO manager credential 144 and the (shipper) role credential 146-2 matches the VO identified in the method of the (get choreography) service call 148-2. This is to ensure that the caller has a credential not just for any VO, but for the particular VO 110 that the service call 148-2 is attempting to access. In stage 1170, the PEP 140-3 sends an authorization request 152-3 to the policy decision point (PDP) 150-3. The PEP 140-3 sends with the authorization request 152-3 information the PDP 150-3 needs to make a decision. Such information includes relevant details of the service call 148-2, and attributes extracted from the (shipper) role credential 146-1 such as the VO identifier 141 and the (shipper) role 143-2.

Going back to FIG. 14, the policy decision point (PDP) 150-3 evaluates authorization request 152-3 by consulting the infrastructure access policies 166 to determine if for the VO identifier 141 presented, the (shipper) role presented 143-2 is authorized to make the (get choreography) service call 148-2 presented. The PDP sends an authorization decision 154-3 back to the PEP 140-3 indicating whether the service call 148-1 is authorized or denied.

Figure 15:
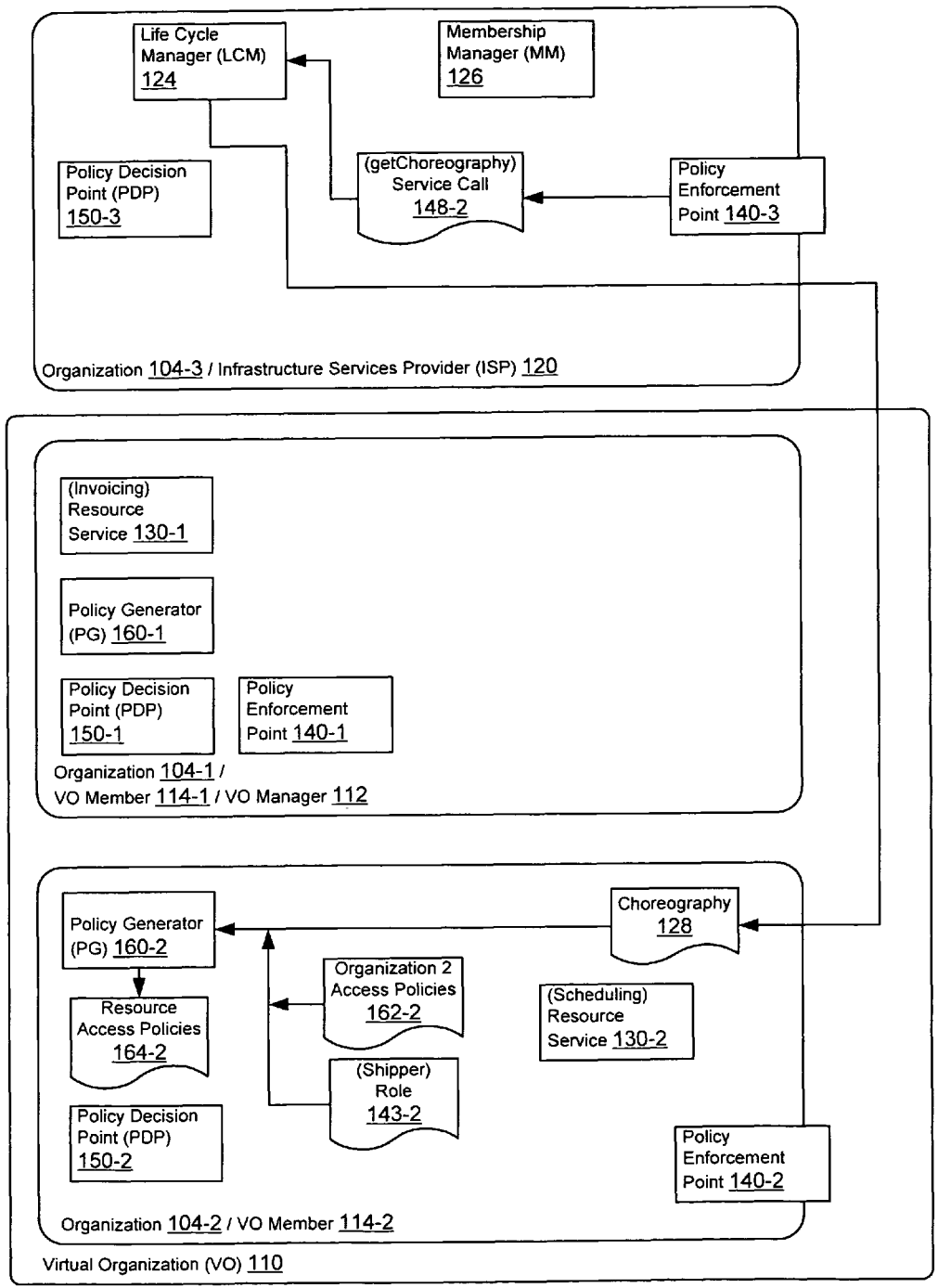
FIG. 15 illustrates the second part of method to create resource access policies, including a method for an infrastructure services provider (ISP) to provide the requested choreography for the VO member to use to generate resource access policies.

FIG. 15 illustrates the second part of method to create resource access policies 164. After receiving an affirmative authorization decision 154-3, the policy enforcement point (PEP) 140-3 forwards the (get choreography) service call 148-2 to the life cycle manager 124. The life cycle manager 123 sends the choreography 128 to the second VO member 114-2, which had made the request. The VO member 114-2 provides a policy generator 160-2 to generate resource access policies 164-2. The policy generator takes the choreography 128, determines the roles 143 needed to perform the choreography 128, determines which roles 143 will need to access the resource services 130 provided by the VO member 114-2, and generates entries for the resource access policies 164-2 accordingly. The policy generator 160-2 compares the generated entries for the resource access policies 164-2 against the VO member's 114-2 internal organization access policies 162-2 to ensure that the generated entries do not allow access to a resource service 130 in violation of the organization access policies 162-2. The policy generator 160-2 generates only the minimal policies necessary for the choreography to run, i.e. it conforms to the least privilege principle.

Figure 16:
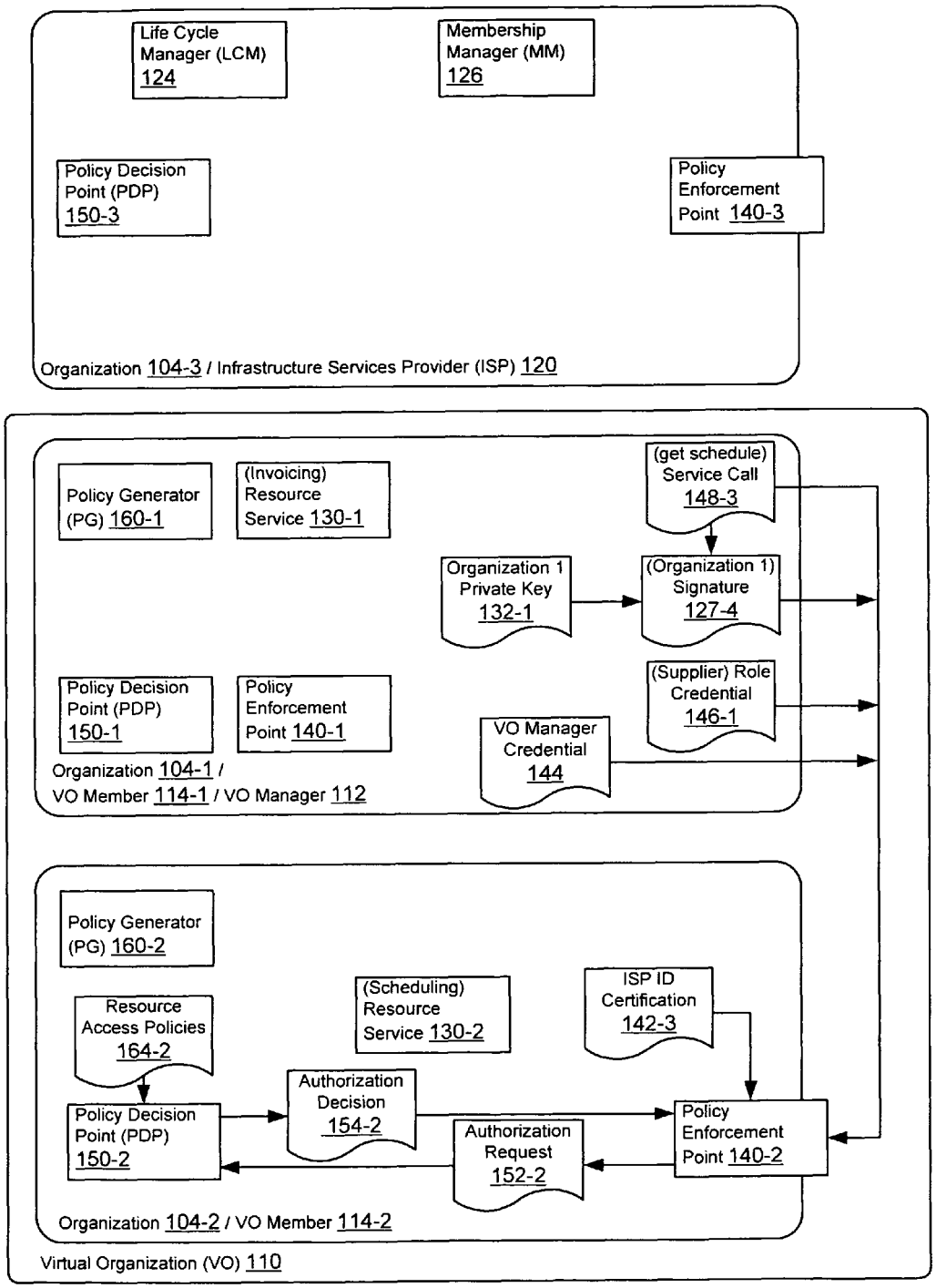
FIG. 16 illustrates the first part of a method for a VO member to handle a service call requesting an operation to be performed by a resource service provided by another VO member.

FIG. 16 illustrates the first part of a method for a VO member 114 to handle a service call 148 requesting an operation to be performed by a resource service 130 provided by another VO member 114. The first organization 104-1 is not acting here as VO manager 112, but rather acting as the first VO member 114-1 performing the (supplier) role 143-1. The first VO member 114-1 generates a service call 148-3 requesting resource service 130-2 perform a operation needed in the course of performing the choreography 128. In this example, a (get schedule) operation that returns a schedule of products shipped by the organization 104-2 assigned the (shipper) role 143-2 from the organization 104-1 assigned the supplier role 143-1 to a set of customers. The first VO member 114-1 uses its private key 132-1 to generate a signature 127-4 of the (get schedule) service call 148-3. The VO first member 114-1 sends the (get schedule) service call 148-3, the signature 127-4, the (supplier) role credential 146-1, and a copy of the VO manager credential 144. A policy enforcement point (PEP) 140-2 provided by the second VO member 114-2 intercepts and holds the service call 148-3.

The PEP 140-2 then performs a battery of verifications on the service call 148-3, following the process presented in the flow diagram of FIG. 11, in an identical or substantially similar manner as described above in the discussion of FIG. 14. If any of the verification checks in stages 110-1160 fail, then the service call remains blocked 1190. In stage 1110, the PEP 140-2 verifies the identity of the caller using one of several well known identity authentication methods (e.g. challenge-response protocol). In stage 1120 the PEP 140-2 verifies the authenticity of the VO manager credential 144 using the ISP's public key in the ISP identity certification 142-3. In stage 1125, the PEP 140-2 checks if a role credential 146 was sent with the service call 148-3. In the case where, as here, a role credential 146 was sent, the PEP 140-2 performs the actions of stage 1130. The case where no role credential 146 was sent, is covered in the discussion of FIG. 10 and the initial discussion of FIG. 11. In stage 1130, the PEP 140-2 verifies the (supplier) role credential 146-1 is authentic by using the VO manager public key extracted from the first organization identity certification 142-1 extracted from the VO manager credential 144 to verify the (supplier) role credential 146-1 has been signed by the VO manager 112. In stage 1140, the PEP 140-2 verifies the VO identifier 141 in the VO manager credential 144 matches the VO identifier in the (supplier) role credential 146-1. In stage 1150, the PEP 140-2 verifies that the identity of the caller matches the identity of the organization 104 assigned to the (supplier) role 143-1 as indicated by the organization identity certification 142 in the (supplier) role credential 146-1. In stage 1160, the PEP 140-2 then verifies that the VO identifier 141 in the VO manager credential 144 and the (supplier) role credential 146-1 match the VO identified in the method of the (get schedule) service call 148-3. This is to ensure that the caller has a credential not just for any VO, but for the particular VO 110 that the (get schedule) service call 148-3 is attempting to access. In stage 1170, the PEP 140-2 sends an authorization request 152-2 to the policy decision point (PDP) 150-2. The PEP 140-2 sends with the authorization request 152-2 information the PDP 150-2 needs to make a decision. Such information includes relevant details of the (get schedule) service call 148-3, and attributes extracted from the (supplier) role credential 146-1, such as the VO identifier 141 and the (supplier) role 143-1.

Returning to FIG. 16, the policy decision point (PDP) 150-2 evaluates authorization request 152-2 by consulting the resource access policies 164-2 to determine if for the presented VO identifier 141, the (supplier) role 143-1 is authorized to make the (get schedule) service call 148-3. The PDP sends an authorization decision 154-2 back to the PEP 140-2 indicating whether the service call 148-3 is authorized or denied.

Figure 17:
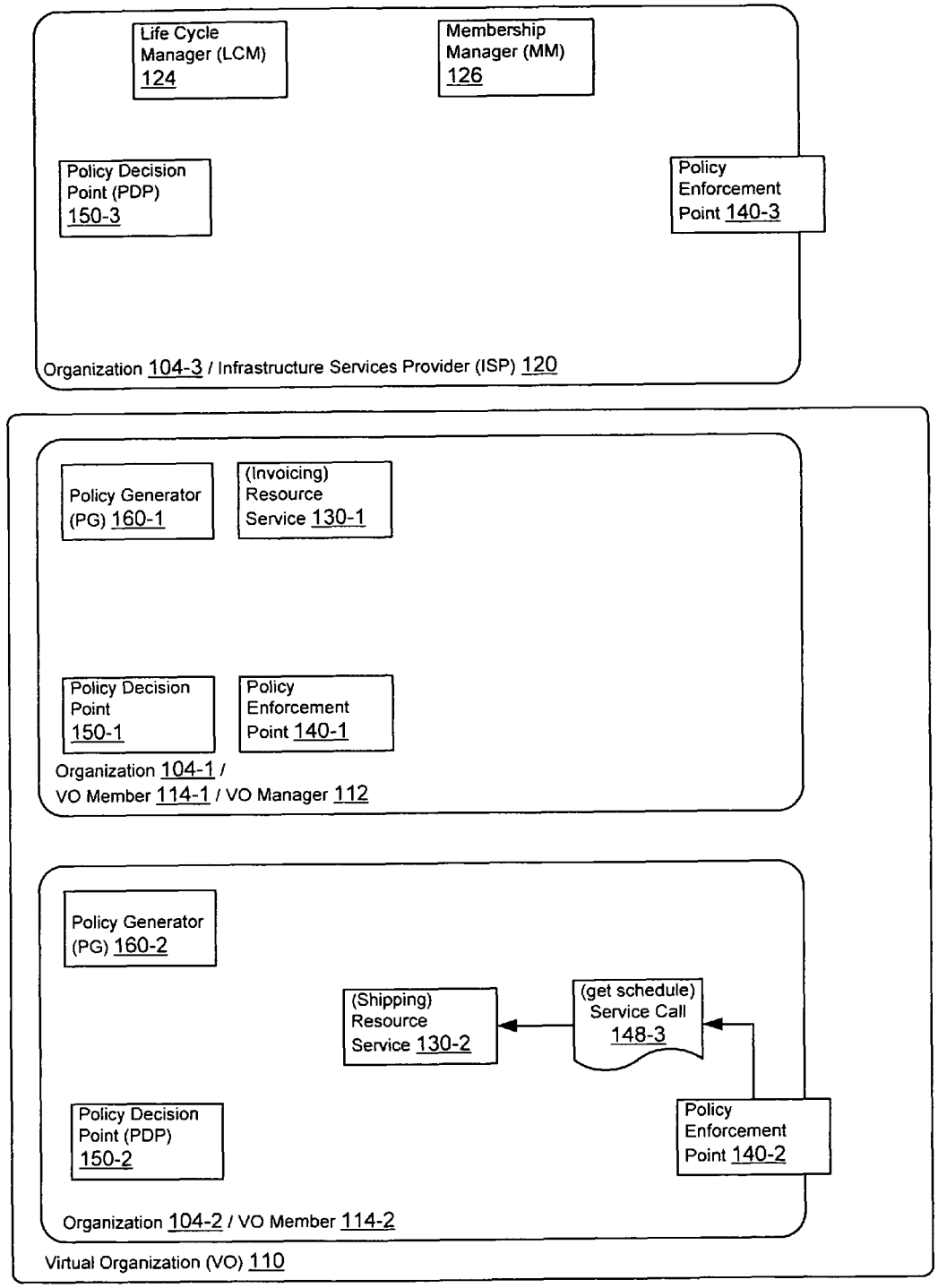
FIG. 17 illustrates the second part of a method for a VO member to handle a service call requesting an operation to be performed by a resource service provided by another VO member.

FIG. 17 illustrates the second part of a method for a VO member 114 to handle a service call 148 requesting an operation to be performed by a resource service 130 provided by another VO member 114. After receiving an affirmative authorization decision 154-3, the policy enforcement point (PEP) 140-2 forwards the (get schedule) service call 148-3 to the (scheduling) resource service 130-2, which then performs the (get schedule) operation requested in the service call 148-3.

Figure 18:
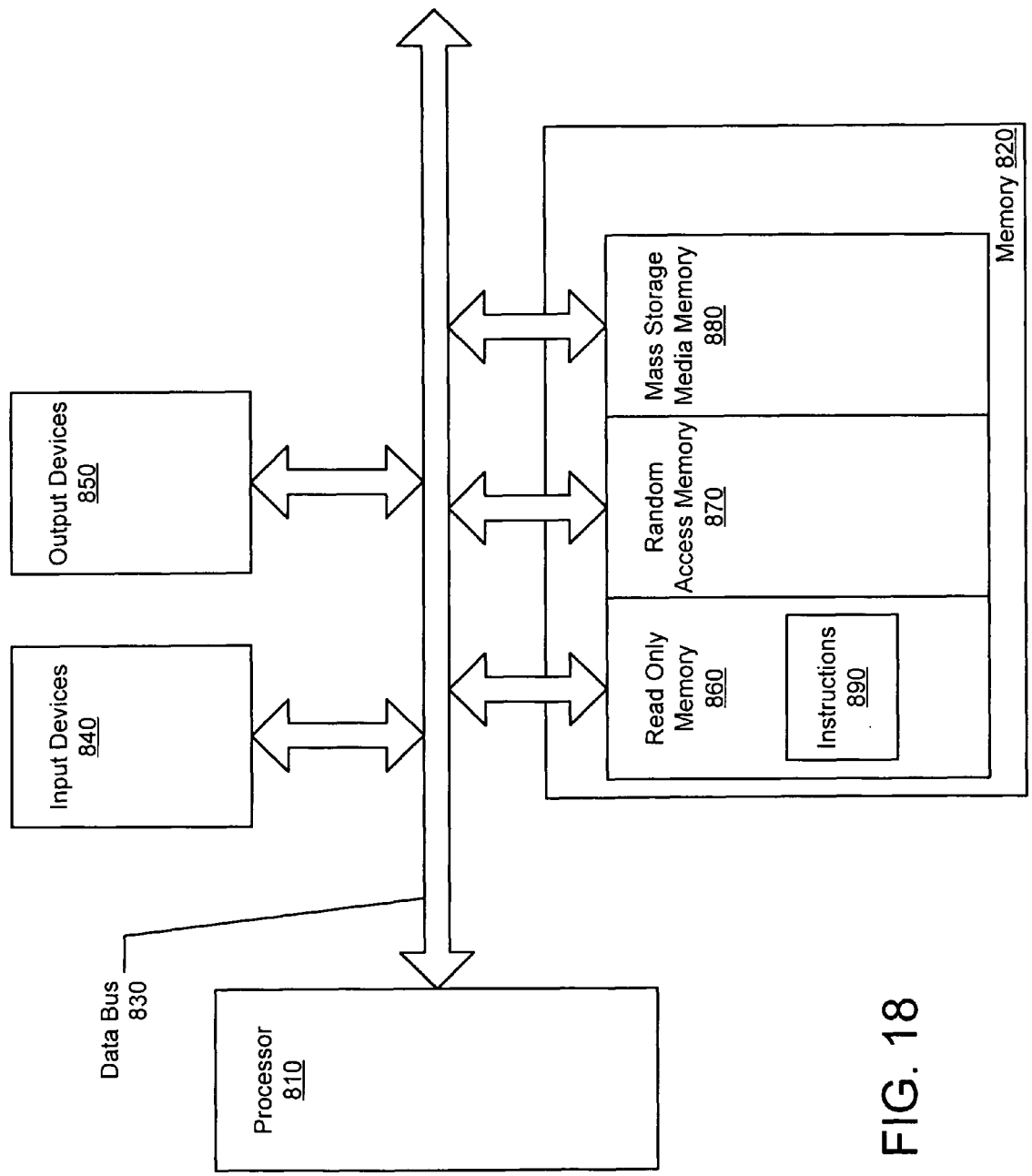
FIG. 18 shows one embodiment of a security mechanism.

FIG. 18 shows one embodiment of a security mechanism. A processor 810 is coupled with a data bus, which is coupled in turn with memory 820, input devices 840 and output devices 850. The memory 820 may comprise read only memory 860, Random Access memory 870, and mass storage medial memory. Instructions 890 stored in the memory 820, the instructions 890, when executed by the processor 810 cause the security mechanism to perform the various functions of a security mechanism, as described above. In some embodiments, the security mechanism is the instructions 890 only and the processor 810 executes other sets of instructions that perform other functions for the organization in possession of the processor 810 as well as executing the security mechanism instructions 890.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM) 860); random access memory (RAM) 870; mass storage media memory 880 such as magnetic disk storage media; optical storage media; flash memory devices; etc.), as well as Input Devices 840 or Output Devices 850 that use electrical, optical, acoustical or other form of propagated signals (e.g., carrier waves, infrared signals, digital signals, etc.); etc.

In some embodiments, hard-wired circuitry may be used in place of or in combination with one or more processors executing machine-accessible instructions to implement the present invention. Thus, the present invention is not limited to any specific combination of hardware circuitry and processors executing machine-accessible instructions.

What is claimed is:

1. An infrastructure services provider having a processor and a memory to implement access control security to both resource services and infrastructure services on behalf of members of a virtual organization separate from the infrastructure services provider, each of the members of the virtual organization connected to the infrastructure services provider via a network, the infrastructure services provider comprising:

a first security mechanism coupled with the processor and the memory to:
(i) intercept, via the network, a first service call originating from a first member of the virtual organization requesting access to a resource service provided by a second member of the virtual organization, the resource service operable to secure authentication and access control for services offered as resources by the virtual organization to further objectives of the virtual organization,
(ii) authenticate the first service call via the first security mechanism within the infrastructure services provider based on access policies specified by the virtual organization, and
(iii) forward the first service call to the second member of the virtual organization upon successful authentication;
a second security mechanism coupled with the processor and the memory to:
(i) intercept, via the network, a second service call originating from the first member of the virtual organization requesting access to an infrastructure service provided by the second member of the virtual organization, the infrastructure service operable to secure authentication and access control for virtual organization management services,
(ii) authenticate the second service call via the second security mechanism within the infrastructure services provider based on the access policies specified by the virtual organization,
(iii) forward the second service call to the second member of the virtual organization upon successful authentication; and wherein each of the first and second security mechanisms further comprise:
a policy enforcement point to prevent the first or second service call respectively, from reaching any of the members of the virtual organization until the security mechanism has made a decision to authorize the service call, and a policy decision point coupled with the policy enforcement point to make the decision to authorize or deny the first or second service call respectively.

2. The infrastructure services provider of claim 1:
wherein the first security mechanism decides to authorize or deny the first service call based on attributes from credential details of the service call, and based further on a set of role-based virtual organization service access policies for the respective virtual organization service of the virtual organization relative to the resource service to be accessed; and
wherein the second security mechanism decides to authorize or deny the second service call based on attributes from credential details of the second service call, and based further on a set of role-based virtual organization service access policies for the respective virtual organization service of the virtual organization relative to the infrastructure service to be accessed.

3. The infrastructure services provider of claim 2, further comprising:
a third security mechanism to control access to one or more of the members of the virtual organization having a second resource service, wherein the third security mechanism to intercept a third service call to the second resource service of the respective one of the members of the virtual organization before the third service call accesses the second resource service for the one member of the virtual organization.

4. The infrastructure services provider of claim 1, wherein:
the first security mechanism and the second security mechanism are provided by an organization that is not one of the members of the virtual organization which provides the resource and infrastructure services.

5. The infrastructure services provider of claim 1 wherein the policy decision point to make the decision to authorize or deny the first or second service call bases the decision on a detail of the first or second service call.

6. The infrastructure services provider of claim 1 wherein the policy decision point to make the decision to authorize or deny the first or second service call bases the decision on a set of role based virtual organization services access policies.

7. The infrastructure services provider of claim 6 wherein the set of role based virtual organization services access policies includes:
a set of role based infrastructure access policies at the second security mechanism, and
a set of role based resource access policies at the first security mechanism based on a set of virtual organization access policies provided by a member of the virtual organization providing the resource service.

8. The infrastructure services provider of claim 1 wherein the policy decision point to make the decision to authorize or deny the first and second service calls bases the decision on an attribute from a credential of a party making the first or second service calls.

9. The infrastructure services provider of claim 8 wherein the attribute from the credential of the party making the first or second service calls includes:
a role assigned to the party making the first or second service calls in the virtual organization to which the service call is directed.

10. In an infrastructure services provider having a processor and a memory to implement access control security to resource services on behalf of members of a virtual organization separate from the infrastructure services provider, each of the members of the virtual organization connected to the infrastructure services provider via a network, a method comprising:
intercepting, via a first security mechanism of the infrastructure provider and coupled with the processor and the memory, a first service call originating from a first member of the virtual organization requesting access to a resource service provided by a second member of the virtual organization, the resource service operable to secure authentication and access control for services offered as resources by the virtual organization to further objectives of the virtual organization, wherein the first service call is prevented from accessing the resource service until the first security mechanism has decided to authorize the first service call;
authenticating the first service call via the first security mechanism within the infrastructure services provider based on access policies specified by the virtual organization;
forwarding the first service call to the second member of the virtual organization upon successful authentication; and
intercepting, via a second security mechanism of the infrastructure provider and coupled with the processor and the memory, a second service call originating from the first member of the virtual organization requesting access to an infrastructure service provided by the second member of the virtual organization, the infrastructure service operable to secure authentication and access control for virtual organization management services, wherein the second service call is prevented from accessing the infrastructure service until the second security mechanism has decided to authorize the second service call; and
wherein each of the first and second security mechanisms further comprise:
a policy enforcement point to prevent the first or second service call respectively, from reaching any of the members of the virtual organization until the security mechanism has made a decision to authorize the service call, and
a policy decision point coupled with the policy enforcement point to make the decision to authorize or deny the first or second service call respectively.

11. The method of claim 10 further comprising:
authenticating the second service call via the second security mechanism within the infrastructure services provider based on access policies specified by the virtual organization; and
forwarding the second service call to the second member of the virtual organization upon successful authentication.

12. The method of claim 11 wherein deciding to authorize or deny the first or second service call is based on a detail of the first or second service call respectively.

13. The method of claim 11 wherein deciding to authorize or deny the first or second service call is based on a set of role-based virtual organization services access policies, and on a role assigned to the party making the first or second service call.

14. The method of claim 13 wherein deciding to authorize or deny the first or second service call based on the set of role-based virtual organization services access policies further includes:
deciding based on a set of infrastructure access policies, if the second security mechanism is controlling access to infrastructure services, wherein the set of infrastructure access policies is based on a set of roles in a choreography that governs the virtual organization and deciding based on a set of resource access policies, if the first security mechanism is controlling access to the resource service, wherein the resource access policies is based on a set of roles in a choreography that governs the virtual organization and a set of organization access policies provided by the virtual organization member providing the resource service.

15. A method in an infrastructure services provider having a machine-readable storage medium with instructions stored thereon that, when executed by a processor of the infrastructure services provider, the instructions perform a method implementing access control security to both resource services and infrastructure services on behalf of members of a virtual organization separate from the infrastructure services provider, each of the members of the virtual organization connected to the infrastructure services provider via a network, the method comprising:

intercepting, via a first security mechanism of the infrastructure provider and coupled with the processor and the memory, a first service call originating from a first member of the virtual organization requesting access to a resource service provided by a second member of the virtual organization, the resource service operable to secure authentication and access control for services offered as resources by the virtual organization to further objectives of the virtual organization, wherein the first service call is prevented from accessing the resource service until the first security mechanism has decided to authorize the first service call;

authenticating the first service call via the first security mechanism within the infrastructure services provider based on access policies specified by the virtual organization;

forwarding the first service call to the second member of the virtual organization upon successful authentication;

intercepting, via a second security mechanism of the infrastructure provider and coupled with the processor and the memory, a second service call originating from the first member of the virtual organization requesting access to an infrastructure service provided by the second member of the virtual organization, the infrastructure service operable to secure authentication and access control for virtual organization management services, wherein the second service call is prevented from accessing the infrastructure service until the second security mechanism has decided to authorize the second service call;

authenticating the second service call via the second security mechanism within the infrastructure services provider based on access policies specified by the virtual organization;

forwarding the second service call to the second member of the virtual organization upon successful authentication; and wherein each of the first and second security mechanisms further comprise:

a policy enforcement point to prevent the first or second service call respectively, from reaching any of the members of the virtual organization until the security mechanism has made a decision to authorize the service call, and a policy decision point coupled with the policy enforcement point to make the decision to authorize or deny the first or second service call respectively.

16. The method of claim 15, wherein:

the resource service further is one of a set of web services to perform operations to advance the objectives of the virtual organization, and the infrastructure service further is one of a set of web services to perform management operations on the virtual organization.

17. The method of claim 15, wherein each virtual organization member generates a set of resource service policies based on a set of roles and based further on a set of organization access policies, wherein the set of roles and the set of organization access policies are provided by each respective virtual organization member.

* * * * *